(12) United States Patent
David et al.

(10) Patent No.: US 11,237,020 B2
(45) Date of Patent: Feb. 1, 2022

(54) MAGNETIC FIELD SENSOR HAVING TWO ROWS OF MAGNETIC FIELD SENSING ELEMENTS FOR MEASURING AN ANGLE OF ROTATION OF A MAGNET

(71) Applicant: Allegro MicroSystems, LLC, Manchester, NH (US)

(72) Inventors: Paul A. David, Bow, NH (US); William P. Taylor, Amherst, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 239 days.

(21) Appl. No.: 16/683,800

(22) Filed: Nov. 14, 2019

(65) Prior Publication Data
US 2021/0148730 A1    May 20, 2021

(51) Int. Cl.
*G01D 5/14* (2006.01)
*G01D 5/16* (2006.01)

(52) U.S. Cl.
CPC ............... *G01D 5/145* (2013.01); *G01D 5/16* (2013.01)

(58) Field of Classification Search
CPC .................................. G01D 5/145; G01D 5/16
See application file for complete search history.

(56) References Cited

U.S. PATENT DOCUMENTS

| | | |
|---|---|---|
| 3,132,337 A | 5/1964 | Martin |
| 3,195,043 A | 7/1965 | Burig et al. |
| 3,281,628 A | 10/1966 | Bauer et al. |
| 3,607,528 A | 9/1971 | Gassaway |
| 3,611,138 A | 10/1971 | Winebrener |
| 3,661,061 A | 5/1972 | Tokarz |
| 3,728,786 A | 4/1973 | Lucas et al. |
| 4,048,670 A | 9/1977 | Eysermans |
| 4,079,360 A | 3/1978 | Ookubo et al. |
| 4,180,753 A | 12/1979 | Cook, II |
| 4,188,605 A | 2/1980 | Stout |
| 4,204,317 A | 5/1980 | Winn |
| 4,236,832 A | 12/1980 | Komatsu et al. |
| 4,283,643 A | 8/1981 | Levin |
| 4,315,523 A | 2/1982 | Mahawili et al. |
| 4,438,347 A | 3/1984 | Gehring |

(Continued)

FOREIGN PATENT DOCUMENTS

| | | |
|---|---|---|
| CH | 683469 | 3/1994 |
| CN | 102323554 | 1/2012 |

(Continued)

OTHER PUBLICATIONS

Extended European Search Report dated Jun. 18, 2021 for European Application No. 21164122.0; 12 Pages.

(Continued)

*Primary Examiner* — Reena Aurora
(74) *Attorney, Agent, or Firm* — Daly, Crowley, Mofford & Durkee, LLP

(57) ABSTRACT

A magnetic field sensor has first and second rows of magnetic field sensing elements coupled to an electronic circuit. A magnet can be disposed under or over the magnetic field sensor. The magnetic field sensor is operable to use the first and second rows of magnetic field sensing elements and the electronic circuit to detect a relative rotation angle between the magnet and the first and second rows of magnetic field sensing elements.

13 Claims, 11 Drawing Sheets

(56) References Cited

U.S. PATENT DOCUMENTS

| | | |
|---|---|---|
| 4,490,674 A | 12/1984 | Ito |
| 4,573,258 A | 3/1986 | Io et al. |
| 4,614,111 A | 9/1986 | Wolff |
| 4,649,796 A | 3/1987 | Schmidt |
| 4,668,914 A | 5/1987 | Kersten et al. |
| 4,670,715 A | 6/1987 | Fuzzell |
| 4,719,419 A | 1/1988 | Dawley |
| 4,733,455 A | 3/1988 | Nakamura et al. |
| 4,745,363 A | 5/1988 | Carr et al. |
| 4,746,859 A | 5/1988 | Malik |
| 4,752,733 A | 6/1988 | Petr et al. |
| 4,758,943 A | 7/1988 | Aström et al. |
| 4,760,285 A | 7/1988 | Nelson |
| 4,761,569 A | 8/1988 | Higgs |
| 4,764,767 A | 8/1988 | Ichikawa et al. |
| 4,769,344 A | 9/1988 | Sakai et al. |
| 4,772,929 A | 9/1988 | Manchester |
| 4,789,826 A | 12/1988 | Willett |
| 4,796,354 A | 1/1989 | Yokoyama et al. |
| 4,823,075 A | 4/1989 | Alley |
| 4,829,352 A | 5/1989 | Popovic et al. |
| 4,833,406 A | 5/1989 | Foster |
| 4,893,027 A | 1/1990 | Kammerer et al. |
| 4,908,685 A | 3/1990 | Shibasaki et al. |
| 4,910,861 A | 3/1990 | Dohogne |
| 4,935,698 A | 6/1990 | Kawaji et al. |
| 4,944,028 A | 7/1990 | Iijima et al. |
| 4,954,777 A | 9/1990 | Klopfer et al. |
| 4,970,411 A | 11/1990 | Haig et al. |
| 4,983,916 A | 1/1991 | Iijima et al. |
| 5,012,322 A | 4/1991 | Guillotte |
| 5,021,493 A | 6/1991 | Sandstrom |
| 5,028,868 A | 7/1991 | Murata et al. |
| 5,038,130 A | 8/1991 | Eck et al. |
| 5,045,920 A | 9/1991 | Vig et al. |
| 5,078,944 A | 1/1992 | Yoshino |
| 5,084,289 A | 1/1992 | Shin et al. |
| 5,121,289 A | 6/1992 | Gagliardi |
| 5,137,677 A | 8/1992 | Murata |
| 5,139,973 A | 8/1992 | Nagy et al. |
| 5,167,896 A | 12/1992 | Hirota et al. |
| 5,168,244 A | 12/1992 | Muranaka |
| 5,185,919 A | 2/1993 | Hickey |
| 5,196,794 A | 3/1993 | Murata |
| 5,200,698 A | 4/1993 | Thibaud |
| 5,210,493 A | 5/1993 | Schroeder et al. |
| 5,216,405 A | 6/1993 | Schroeder et al. |
| 5,220,207 A | 6/1993 | Kovalcik et al. |
| 5,244,834 A | 9/1993 | Suzuki et al. |
| 5,247,202 A | 9/1993 | Popovic et al. |
| 5,247,278 A | 9/1993 | Pant et al. |
| 5,250,925 A | 10/1993 | Shinkle |
| 5,286,426 A | 2/1994 | Rano, Jr. et al. |
| 5,289,344 A | 2/1994 | Gagnon et al. |
| 5,291,133 A | 3/1994 | Gokhale et al. |
| 5,304,926 A | 4/1994 | Wu |
| 5,315,245 A | 5/1994 | Schroeder et al. |
| 5,329,416 A | 7/1994 | Ushiyama et al. |
| 5,331,478 A | 7/1994 | Aranovsky |
| 5,332,956 A | 7/1994 | Oh |
| 5,332,965 A | 7/1994 | Wolf et al. |
| 5,341,097 A | 8/1994 | Wu |
| 5,351,028 A | 9/1994 | Krahn |
| 5,399,968 A | 3/1995 | Sheppard et al. |
| 5,412,255 A | 5/1995 | Wallrafen |
| 5,414,355 A | 5/1995 | Davidson et al. |
| 5,424,558 A | 6/1995 | Borden et al. |
| 5,432,444 A | 7/1995 | Yasohama et al. |
| 5,434,105 A | 7/1995 | Liou |
| 5,453,727 A | 9/1995 | Shibasaki et al. |
| 5,469,058 A | 11/1995 | Dunnam |
| 5,477,143 A | 12/1995 | Wu |
| 5,479,695 A | 1/1996 | Grader et al. |
| 5,486,759 A | 1/1996 | Seiler et al. |
| 5,488,294 A | 1/1996 | Liddell et al. |
| 5,491,633 A | 2/1996 | Henry et al. |
| 5,497,081 A | 3/1996 | Wolf et al. |
| 5,497,083 A | 3/1996 | Nakazato et al. |
| 5,500,589 A | 3/1996 | Sumcad |
| 5,500,994 A | 3/1996 | Itaya |
| 5,508,611 A | 4/1996 | Schroeder et al. |
| 5,521,501 A | 5/1996 | Dettmann et al. |
| 5,541,506 A | 7/1996 | Kawakita et al. |
| 5,545,983 A | 8/1996 | Okeya et al. |
| 5,551,146 A | 9/1996 | Kawabata et al. |
| 5,552,706 A | 9/1996 | Carr |
| 5,572,058 A | 11/1996 | Biard |
| 5,581,170 A | 12/1996 | Mammano et al. |
| 5,581,179 A | 12/1996 | Engel et al. |
| 5,583,436 A | 12/1996 | Van De Walle et al. |
| 5,585,574 A | 12/1996 | Sugihara et al. |
| 5,596,272 A | 1/1997 | Busch |
| 5,612,618 A | 3/1997 | Arakawa |
| 5,619,137 A | 4/1997 | Vig et al. |
| 5,621,319 A | 4/1997 | Bilotti et al. |
| 5,627,315 A | 5/1997 | Figi et al. |
| 5,631,557 A | 5/1997 | Davidson |
| 5,640,090 A | 6/1997 | Furuya et al. |
| 5,657,189 A | 8/1997 | Sandhu |
| 5,691,637 A | 11/1997 | Oswald et al. |
| 5,694,038 A | 12/1997 | Moody et al. |
| 5,696,790 A | 12/1997 | Graham et al. |
| 5,712,562 A | 1/1998 | Berg |
| 5,714,102 A | 2/1998 | Highum et al. |
| 5,719,496 A | 2/1998 | Wolf |
| 5,729,128 A | 3/1998 | Bunyer et al. |
| 5,757,181 A | 5/1998 | Wolf et al. |
| 5,781,005 A | 7/1998 | Vig et al. |
| 5,789,658 A | 8/1998 | Henn et al. |
| 5,789,915 A | 8/1998 | Ingraham |
| 5,796,249 A | 8/1998 | Andräet et al. |
| 5,818,222 A | 10/1998 | Ramsden |
| 5,818,223 A | 10/1998 | Wolf |
| 5,831,513 A | 11/1998 | Lue |
| 5,839,185 A | 11/1998 | Smith et al. |
| 5,841,276 A | 11/1998 | Makino et al. |
| 5,844,411 A | 12/1998 | Vogt |
| 5,859,387 A | 1/1999 | Gagnon |
| 5,886,070 A | 2/1999 | Honkura et al. |
| 5,883,567 A | 3/1999 | Mullins, Jr. |
| 5,912,556 A | 6/1999 | Frazee et al. |
| 5,942,895 A | 8/1999 | Popovic et al. |
| 5,963,028 A | 10/1999 | Engel et al. |
| 6,011,770 A | 1/2000 | Tan |
| 6,016,055 A | 1/2000 | Jager et al. |
| 6,043,644 A | 3/2000 | de Coulon et al. |
| 6,043,646 A | 3/2000 | Jansseune |
| 6,064,199 A | 5/2000 | Walter et al. |
| 6,064,202 A | 5/2000 | Steiner et al. |
| 6,091,239 A | 7/2000 | Vig et al. |
| 6,100,680 A | 8/2000 | Vig et al. |
| 6,100,754 A | 8/2000 | Kim et al. |
| 6,136,250 A | 10/2000 | Brown |
| 6,166,535 A | 12/2000 | Irle et al. |
| 6,169,396 B1 | 1/2001 | Yokotani et al. |
| 6,175,232 B1 | 1/2001 | De Coulon et al. |
| 6,175,233 B1 | 1/2001 | McCurley et al. |
| 6,180,041 B1 | 1/2001 | Takizawa |
| 6,181,036 B1 | 1/2001 | Kazama et al. |
| 6,184,679 B1 | 2/2001 | Popovic et al. |
| 6,194,893 B1 | 2/2001 | Yokotani et al. |
| 6,198,373 B1 | 3/2001 | Ogawa et al. |
| 6,232,768 B1 | 5/2001 | Moody et al. |
| 6,236,199 B1 | 5/2001 | Irle et al. |
| 6,242,604 B1 | 6/2001 | Hudlicky et al. |
| 6,242,904 B1 | 6/2001 | Shirai et al. |
| 6,242,905 B1 | 6/2001 | Draxelmayr |
| 6,265,864 B1 | 7/2001 | De Winter et al. |
| 6,265,865 B1 | 7/2001 | Engel et al. |
| 6,278,269 B1 | 8/2001 | Vig et al. |
| 6,288,533 B1 | 9/2001 | Haeberli et al. |
| 6,291,989 B1 | 9/2001 | Schroeder |
| 6,297,627 B1 | 10/2001 | Towne et al. |
| 6,297,628 B1 | 10/2001 | Bicking et al. |

(56) References Cited

U.S. PATENT DOCUMENTS

| | | |
|---|---|---|
| 6,323,642 B1 | 11/2001 | Nishimura et al. |
| 6,339,322 B1 | 1/2002 | Loreck et al. |
| 6,351,506 B1 | 2/2002 | Lewicki |
| 6,356,068 B1 | 3/2002 | Steiner et al. |
| 6,356,741 B1 | 3/2002 | Bilotti et al. |
| 6,366,079 B1 | 4/2002 | Uenoyama |
| 6,392,478 B1 | 5/2002 | Mulder et al. |
| 6,429,640 B1 | 8/2002 | Daughton et al. |
| 6,436,748 B1 | 8/2002 | Forbes et al. |
| 6,437,558 B2 | 8/2002 | Li et al. |
| 6,452,381 B1 | 9/2002 | Nakatani et al. |
| 6,462,536 B1 | 10/2002 | Mednikov et al. |
| 6,492,804 B2 | 12/2002 | Tsuge et al. |
| 6,501,270 B1 | 12/2002 | Opie |
| 6,504,363 B1 | 1/2003 | Dogaru et al. |
| 6,525,531 B2 | 2/2003 | Forrest et al. |
| 6,528,992 B2 | 3/2003 | Shinjo et al. |
| 6,542,068 B1 | 4/2003 | Drapp et al. |
| 6,542,847 B1 | 4/2003 | Lohberg et al. |
| 6,545,332 B2 | 4/2003 | Huang |
| 6,545,457 B2 | 4/2003 | Goto et al. |
| 6,545,462 B2 | 4/2003 | Schott et al. |
| 6,566,862 B1 | 5/2003 | Goto et al. |
| 6,566,872 B1 | 5/2003 | Sugitani |
| 6,590,804 B1 | 7/2003 | Perner |
| 6,622,012 B2 | 9/2003 | Bilotti et al. |
| 6,640,451 B1 | 11/2003 | Vinarcik |
| 6,653,968 B1 | 11/2003 | Schneider |
| 6,674,679 B1 | 1/2004 | Perner et al. |
| 6,687,644 B1 | 2/2004 | Zinke et al. |
| 6,692,676 B1 | 2/2004 | Vig et al. |
| 6,759,843 B2 | 7/2004 | Furlong |
| 6,768,301 B1 | 7/2004 | Hohe et al. |
| 6,770,163 B1 | 8/2004 | Kuah et al. |
| 6,781,233 B2 | 8/2004 | Zverev et al. |
| 6,781,359 B2 | 8/2004 | Stauth et al. |
| 6,798,193 B2 | 9/2004 | Zimmerman et al. |
| 6,815,944 B2 | 11/2004 | Vig et al. |
| 6,822,443 B1 | 11/2004 | Dogaru |
| 6,853,178 B2 | 2/2005 | Hayat-Dawoodi |
| 6,896,407 B2 | 5/2005 | Nomiyama et al. |
| 6,902,951 B2 | 6/2005 | Goller et al. |
| 6,917,321 B1 | 7/2005 | Haurie et al. |
| 6,969,988 B2 | 11/2005 | Kakuta et al. |
| 7,023,205 B1 | 4/2006 | Krupp |
| 7,026,808 B2 | 4/2006 | Vig et al. |
| 7,030,606 B2 | 4/2006 | Kato et al. |
| 7,031,170 B2 | 4/2006 | Daeche et al. |
| 7,038,448 B2 | 5/2006 | Schott et al. |
| 7,049,924 B2 | 5/2006 | Hayashi et al. |
| 7,085,119 B2 | 8/2006 | Bilotti et al. |
| 7,112,955 B2 | 9/2006 | Buchhold |
| 7,112,957 B2 | 9/2006 | Bicking |
| 7,119,538 B2 | 10/2006 | Blossfeld |
| 7,126,327 B1 | 10/2006 | Busch |
| 7,132,825 B2 | 11/2006 | Martin |
| 7,159,556 B2 | 1/2007 | Yoshihara |
| 7,184,876 B2 | 2/2007 | Tuelings et al. |
| 7,190,784 B2 | 3/2007 | Li |
| 7,193,412 B2 | 3/2007 | Freeman |
| 7,199,579 B2 | 4/2007 | Scheller et al. |
| 7,235,968 B2 | 6/2007 | Popovic et al. |
| 7,250,760 B2 | 7/2007 | Ao |
| 7,259,545 B2 | 8/2007 | Stauth et al. |
| 7,259,556 B2 | 8/2007 | Popovic et al. |
| 7,265,531 B2 | 9/2007 | Stauth et al. |
| 7,269,992 B2 | 9/2007 | Lamb et al. |
| 7,285,952 B1 | 10/2007 | Hatanaka et al. |
| 7,292,095 B2 | 11/2007 | Burt et al. |
| 7,295,000 B2 | 11/2007 | Werth |
| 7,307,824 B2 | 12/2007 | Bilotti et al. |
| 7,319,319 B2 | 1/2008 | Jones et al. |
| 7,323,780 B2 | 1/2008 | Daubenspeck et al. |
| 7,323,870 B2 | 1/2008 | Tatschl et al. |
| 7,325,175 B2 | 1/2008 | Momtaz |
| 7,345,468 B2 | 3/2008 | Okada et al. |
| 7,355,388 B2 | 4/2008 | Ishio |
| 7,361,531 B2 | 4/2008 | Sharma et al. |
| 7,362,094 B2 | 4/2008 | Voisine et al. |
| 7,365,530 B2 | 4/2008 | Bailey et al. |
| 7,385,394 B2 | 6/2008 | Auburger et al. |
| 7,425,821 B2 | 9/2008 | Monreal et al. |
| 7,474,093 B2 | 1/2009 | Ausserlechner |
| 7,476,953 B2 | 1/2009 | Taylor et al. |
| 7,518,354 B2 | 4/2009 | Stauth et al. |
| 7,592,801 B2 | 9/2009 | Bailey et al. |
| 7,598,601 B2 | 10/2009 | Taylor et al. |
| 7,605,647 B1 | 10/2009 | Romero et al. |
| 7,635,993 B2 | 12/2009 | Boeve |
| 7,694,200 B2 | 4/2010 | Forrest et al. |
| 7,701,208 B2 | 4/2010 | Nishikawa |
| 7,714,570 B2 | 5/2010 | Thomas et al. |
| 7,729,675 B2 | 6/2010 | Krone |
| 7,746,056 B2 | 6/2010 | Stauth et al. |
| 7,746,065 B2 | 6/2010 | Pastre et al. |
| 7,759,929 B2 | 7/2010 | Forsyth |
| 7,764,118 B2 | 7/2010 | Kusuda et al. |
| 7,768,083 B2 | 8/2010 | Doogue et al. |
| 7,769,110 B2 | 8/2010 | Momtaz |
| 7,772,838 B2 | 8/2010 | Bailey et al. |
| 7,800,389 B2 | 9/2010 | Friedrich et al. |
| 7,808,074 B2 | 10/2010 | Knittl |
| 7,816,772 B2 | 10/2010 | Engel et al. |
| 7,816,905 B2 | 10/2010 | Doogue et al. |
| 7,839,141 B2 | 11/2010 | Werth et al. |
| 7,872,322 B2 | 1/2011 | Schott et al. |
| 7,911,203 B2 | 3/2011 | Thomas et al. |
| 7,915,886 B2 | 3/2011 | Stolfus et al. |
| 7,923,996 B2 | 4/2011 | Doogue et al. |
| 7,936,144 B2 | 5/2011 | Vig et al. |
| 7,956,604 B2 | 6/2011 | Ausserlechner |
| 7,961,823 B2 | 6/2011 | Kolze et al. |
| 7,965,076 B2 | 6/2011 | Schott |
| 7,990,209 B2 | 8/2011 | Romero |
| 7,994,774 B2 | 8/2011 | Thomas et al. |
| 8,030,918 B2 | 10/2011 | Doogue et al. |
| 8,058,870 B2 | 11/2011 | Sterling |
| 8,063,631 B2 | 11/2011 | Fermon et al. |
| 8,063,634 B2 | 11/2011 | Sauber et al. |
| 8,080,993 B2 | 12/2011 | Theuss et al. |
| 8,089,276 B2 | 1/2012 | Kentsch |
| 8,106,649 B2 | 1/2012 | Kaita et al. |
| 8,106,654 B2 | 1/2012 | Theuss et al. |
| 8,128,549 B2 | 3/2012 | Testani et al. |
| 8,134,358 B2 | 3/2012 | Charlier et al. |
| 8,143,169 B2 | 3/2012 | Engel et al. |
| 8,253,210 B2 | 8/2012 | Theuss et al. |
| 8,274,279 B2 | 9/2012 | Gies |
| 8,362,579 B2 | 1/2013 | Theuss et al. |
| 8,542,010 B2 | 9/2013 | Cesaretti et al. |
| 8,559,139 B2 | 10/2013 | Theuss |
| 8,577,634 B2 | 11/2013 | Donovan et al. |
| 8,610,430 B2 | 12/2013 | Werth et al. |
| 8,624,588 B2 | 1/2014 | Vig et al. |
| 8,629,539 B2 | 1/2014 | Milano et al. |
| 8,680,846 B2 | 3/2014 | Cesaretti et al. |
| 8,723,512 B1 | 5/2014 | Burdette et al. |
| 8,754,640 B2 | 6/2014 | Vig et al. |
| 8,773,124 B2 | 7/2014 | Ausserlechner |
| 8,860,404 B2 | 10/2014 | Dwyer et al. |
| 9,081,041 B2 | 7/2015 | Friedrich et al. |
| 9,116,018 B2 | 8/2015 | Frachon |
| 9,164,156 B2 | 10/2015 | Elian et al. |
| 9,201,122 B2 | 12/2015 | Cesaretti et al. |
| 9,201,123 B2 | 12/2015 | Elian et al. |
| 9,347,799 B2 | 5/2016 | Nazarian et al. |
| 9,411,025 B2 | 8/2016 | David et al. |
| 9,719,806 B2 | 8/2017 | Foletto et al. |
| 9,720,054 B2 | 8/2017 | Drouin et al. |
| 9,810,519 B2 | 11/2017 | Taylor et al. |
| 9,823,090 B2 | 11/2017 | Foletto et al. |
| 9,823,092 B2 | 11/2017 | David et al. |
| 10,041,810 B2 | 8/2018 | Vig et al. |
| 10,234,513 B2 | 3/2019 | Vig et al. |

(56) References Cited

U.S. PATENT DOCUMENTS

| | | |
|---|---|---|
| 10,408,892 B2 | 9/2019 | David et al. |
| 2001/0002791 A1 | 6/2001 | Tsuge et al. |
| 2001/0009367 A1 | 7/2001 | Seitzer et al. |
| 2001/0026153 A1 | 10/2001 | Nakamura et al. |
| 2002/0027488 A1 | 3/2002 | Hayat-Dawoodi et al. |
| 2002/0084923 A1 | 7/2002 | Li |
| 2002/0097639 A1 | 7/2002 | Ishizaki et al. |
| 2003/0001563 A1 | 1/2003 | Turner |
| 2003/0038675 A1 | 2/2003 | Gailus et al. |
| 2003/0062891 A1 | 4/2003 | Slates |
| 2003/0102909 A1 | 6/2003 | Motz |
| 2003/0107366 A1 | 6/2003 | Busch et al. |
| 2003/0151406 A1 | 8/2003 | Wan et al. |
| 2003/0173955 A1 | 9/2003 | Uenoyama |
| 2003/0222642 A1 | 12/2003 | Butzmann |
| 2003/0227286 A1 | 12/2003 | Dunisch et al. |
| 2004/0032251 A1 | 2/2004 | Zimmerman et al. |
| 2004/0046248 A1 | 3/2004 | Waelti et al. |
| 2004/0056647 A1 | 3/2004 | Stauth et al. |
| 2004/0062362 A1 | 4/2004 | Matsuya |
| 2004/0080314 A1 | 4/2004 | Tsujii et al. |
| 2004/0135220 A1 | 7/2004 | Goto |
| 2004/0170052 A1 | 9/2004 | Inui |
| 2004/0174164 A1 | 9/2004 | Ao |
| 2004/0184196 A1 | 9/2004 | Jayasekara |
| 2004/0189285 A1 | 9/2004 | Uenoyama |
| 2004/0196045 A1 | 10/2004 | Larsen |
| 2004/0252563 A1 | 12/2004 | Hokuto et al. |
| 2004/0263014 A1 | 12/2004 | Miya |
| 2005/0017709 A1 | 1/2005 | Stolfus et al. |
| 2005/0120782 A1 | 6/2005 | Kishibata et al. |
| 2005/0122095 A1 | 6/2005 | Dooley |
| 2005/0122099 A1 | 6/2005 | Imamoto et al. |
| 2005/0167790 A1 | 8/2005 | Khor et al. |
| 2005/0179429 A1 | 8/2005 | Lohberg |
| 2005/0225318 A1 | 10/2005 | Bailey et al. |
| 2005/0280411 A1 | 12/2005 | Bicking |
| 2006/0011999 A1 | 1/2006 | Schott et al. |
| 2006/0028204 A1 | 2/2006 | Oohira |
| 2006/0033487 A1 | 2/2006 | Nagano et al. |
| 2006/0038559 A1 | 2/2006 | Lamb et al. |
| 2006/0038561 A1 | 2/2006 | Honkura et al. |
| 2006/0068237 A1 | 3/2006 | Murphy |
| 2006/0097715 A1 | 5/2006 | Oohira et al. |
| 2006/0097717 A1 | 5/2006 | Tokuhara et al. |
| 2006/0125473 A1 | 6/2006 | Frachon et al. |
| 2006/0175674 A1 | 8/2006 | Taylor |
| 2006/0181263 A1 | 8/2006 | Doogue et al. |
| 2006/0202692 A1 | 9/2006 | Tatschl et al. |
| 2006/0238190 A1 | 10/2006 | Ishio |
| 2006/0261801 A1 | 11/2006 | Busch |
| 2007/0110199 A1 | 5/2007 | Momtaz et al. |
| 2007/0170533 A1 | 7/2007 | Doogue et al. |
| 2007/0247141 A1 | 10/2007 | Pastre et al. |
| 2007/0285089 A1 | 12/2007 | Ibuki et al. |
| 2007/0290682 A1 | 12/2007 | Oohira et al. |
| 2008/0012558 A1 | 1/2008 | Rossler et al. |
| 2008/0013298 A1 | 1/2008 | Sharma et al. |
| 2008/0094055 A1 | 4/2008 | Monreal et al. |
| 2008/0116884 A1 | 5/2008 | Rettig et al. |
| 2008/0116885 A1 | 5/2008 | Van Zon et al. |
| 2008/0137784 A1 | 6/2008 | Krone |
| 2008/0237818 A1 | 10/2008 | Engel et al. |
| 2008/0238410 A1 | 10/2008 | Charlier et al. |
| 2009/0001964 A1 | 1/2009 | Strzalkowski |
| 2009/0001965 A1 | 1/2009 | Ausserlechner et al. |
| 2009/0001972 A1 | 1/2009 | Fernandez et al. |
| 2009/0009163 A1 | 1/2009 | Yamada |
| 2009/0058404 A1 | 3/2009 | Kurumado |
| 2009/0085706 A1 | 4/2009 | Baarman et al. |
| 2009/0102467 A1 | 4/2009 | Snell et al. |
| 2009/0121707 A1 | 5/2009 | Schott |
| 2009/0137398 A1 | 5/2009 | Bozovic et al. |
| 2009/0140725 A1 | 6/2009 | Ausserlechner |
| 2009/0146647 A1 | 6/2009 | Ausserlechner |
| 2009/0152696 A1 | 6/2009 | Dimasacat et al. |
| 2009/0167298 A1 | 7/2009 | Kreutzbruck et al. |
| 2009/0167301 A1 | 7/2009 | Ausserlechner |
| 2009/0168286 A1 | 7/2009 | Berkley et al. |
| 2009/0174395 A1 | 7/2009 | Thomas et al. |
| 2009/0189600 A1 | 7/2009 | Kurkovskiy |
| 2009/0206827 A1 | 8/2009 | Aimuta et al. |
| 2009/0206831 A1 | 8/2009 | Fermon et al. |
| 2009/0212765 A1 | 8/2009 | Doogue et al. |
| 2009/0243601 A1 | 10/2009 | Feldtkeller |
| 2009/0251134 A1 | 10/2009 | Uenoyama |
| 2009/0256552 A1 | 10/2009 | Guo et al. |
| 2009/0262466 A1 | 10/2009 | Kurata et al. |
| 2009/0315543 A1 | 12/2009 | Guo et al. |
| 2009/0322325 A1 | 12/2009 | Ausserlechner |
| 2009/0326860 A1 | 12/2009 | Hainz et al. |
| 2010/0026279 A1 | 2/2010 | Vig et al. |
| 2010/0026288 A1 | 2/2010 | Sauber et al. |
| 2010/0033175 A1 | 2/2010 | Boeve et al. |
| 2010/0045268 A1 | 2/2010 | Kilian |
| 2010/0052667 A1 | 3/2010 | Kohama et al. |
| 2010/0072988 A1 | 3/2010 | Hammerschmidt et al. |
| 2010/0141249 A1 | 6/2010 | Ararao et al. |
| 2010/0156397 A1 | 6/2010 | Yabusaki et al. |
| 2010/0164491 A1 | 7/2010 | Kejik et al. |
| 2010/0188078 A1 | 7/2010 | Foletto et al. |
| 2010/0201356 A1 | 8/2010 | Koller et al. |
| 2010/0211347 A1 | 8/2010 | Friedrich et al. |
| 2010/0237450 A1 | 9/2010 | Doogue et al. |
| 2010/0276769 A1 | 11/2010 | Theuss et al. |
| 2010/0295140 A1 | 11/2010 | Theuss et al. |
| 2010/0330708 A1 | 12/2010 | Engel et al. |
| 2011/0004278 A1 | 1/2011 | Aghassian et al. |
| 2011/0018533 A1 | 1/2011 | Cesaretti et al. |
| 2011/0031960 A1 | 2/2011 | Hohe et al. |
| 2011/0048102 A1 | 3/2011 | Fernandez et al. |
| 2011/0074405 A1 | 3/2011 | Doogue et al. |
| 2011/0127998 A1 | 6/2011 | Elian et al. |
| 2011/0175605 A1 | 7/2011 | Kim et al. |
| 2011/0224537 A1 | 9/2011 | Brunner |
| 2011/0248708 A1 | 10/2011 | Thomas et al. |
| 2011/0267040 A1 | 11/2011 | Frachon |
| 2011/0285384 A1 | 11/2011 | Nomura |
| 2011/0291650 A1 | 12/2011 | Franke et al. |
| 2011/0298448 A1 | 12/2011 | Foletto et al. |
| 2012/0007589 A1 | 1/2012 | Okada |
| 2012/0013333 A1 | 1/2012 | Ararao et al. |
| 2012/0019236 A1 | 1/2012 | Tiernan et al. |
| 2012/0062215 A1 | 3/2012 | Ide et al. |
| 2012/0086090 A1 | 4/2012 | Sharma et al. |
| 2012/0200290 A1 | 8/2012 | Ausserlechner |
| 2012/0249133 A1 | 10/2012 | Friedrich |
| 2012/0274314 A1 | 11/2012 | Cesaretti et al. |
| 2012/0293167 A1 | 11/2012 | Kitanaka et al. |
| 2012/0303305 A1 | 11/2012 | Bergqvist et al. |
| 2013/0015845 A1 | 1/2013 | Fox |
| 2013/0057257 A1 | 3/2013 | Friedrich et al. |
| 2013/0113474 A1 | 5/2013 | Elian |
| 2013/0214774 A1 | 8/2013 | Cesaretti et al. |
| 2013/0238278 A1 | 9/2013 | Shoemaker et al. |
| 2013/0241543 A1 | 9/2013 | Stenson et al. |
| 2013/0249546 A1 | 9/2013 | David et al. |
| 2013/0265037 A1 | 10/2013 | Friedrich et al. |
| 2013/0278246 A1 | 10/2013 | Stegerer et al. |
| 2013/0300401 A1 | 11/2013 | Krapf et al. |
| 2013/0320970 A1 | 12/2013 | Foletto et al. |
| 2013/0335069 A1 | 12/2013 | Vig et al. |
| 2014/0084906 A1 | 3/2014 | Ruigrok et al. |
| 2014/0175584 A1 | 6/2014 | Foletto et al. |
| 2014/0176126 A1 | 6/2014 | Friedrich et al. |
| 2014/0232379 A1 | 8/2014 | Nazarian et al. |
| 2014/0266176 A1 | 9/2014 | Fernandez et al. |
| 2014/0266181 A1 | 9/2014 | Milano et al. |
| 2014/0305761 A1 | 10/2014 | Kimes |
| 2014/0327435 A1 | 11/2014 | Röhrer |
| 2014/0347044 A1 | 11/2014 | Monreal et al. |
| 2015/0022186 A1 | 1/2015 | Ausserlechner |
| 2015/0022187 A1 | 1/2015 | Taylor et al. |
| 2015/0022193 A1 | 1/2015 | Burdette et al. |

(56) References Cited

U.S. PATENT DOCUMENTS

| | | | |
|---|---|---|---|
| 2015/0022197 A1 | 1/2015 | David et al. | |
| 2015/0022198 A1 | 1/2015 | David et al. | |
| 2015/0211895 A1 | 7/2015 | Reitsma et al. | |
| 2015/0346289 A1 | 12/2015 | Ausserlechner | |
| 2015/0377648 A1 | 12/2015 | Sirohiwala et al. | |
| 2016/0025820 A1 | 1/2016 | Scheller et al. | |
| 2016/0069662 A1 | 3/2016 | Mullenix et al. | |
| 2016/0123774 A1 | 5/2016 | Foletto et al. | |
| 2017/0271399 A1 | 9/2017 | Lee et al. | |
| 2017/0285117 A1 | 10/2017 | Drouin et al. | |
| 2017/0307696 A1 | 10/2017 | Werth et al. | |
| 2017/0314907 A1 | 11/2017 | Taylor et al. | |
| 2017/0328739 A1 | 11/2017 | David et al. | |
| 2017/0356760 A1 | 12/2017 | David et al. | |
| 2018/0011150 A1 | 1/2018 | Pepka et al. | |
| 2018/0172423 A1* | 6/2018 | Ausserlechner | G01B 7/003 |
| 2018/0340911 A1 | 11/2018 | Romero et al. | |
| 2018/0340986 A1 | 11/2018 | Latham et al. | |
| 2018/0340988 A1 | 11/2018 | Latham et al. | |
| 2018/0340989 A1 | 11/2018 | Latham et al. | |
| 2019/0033096 A1 | 1/2019 | David et al. | |
| 2019/0162784 A1* | 5/2019 | Lassalle-Balier | G01R 33/093 |

FOREIGN PATENT DOCUMENTS

| | | |
|---|---|---|
| CN | 102483443 | 5/2012 |
| CN | 102713654 | 10/2012 |
| CN | 102954808 | 3/2013 |
| DE | 2518054 | 11/1976 |
| DE | 4031560 | 4/1992 |
| DE | 19539458 | 4/1997 |
| DE | 68927973 T2 | 9/1997 |
| DE | 19634715 | 3/1998 |
| DE | 19650935 | 6/1998 |
| DE | 19838433 | 3/1999 |
| DE | 19851839 | 11/1999 |
| DE | 19961504 | 6/2001 |
| DE | 10210184 | 9/2003 |
| DE | 10314602 | 10/2004 |
| DE | 102005014509 | 10/2006 |
| DE | 102006037226 | 2/2008 |
| DE | 102007018238 | 10/2008 |
| DE | 102007041230 | 4/2009 |
| DE | 102010016584 | 11/2010 |
| DE | 102011102483 | 11/2012 |
| EP | 0146091 | 6/1985 |
| EP | 0289414 A2 | 2/1988 |
| EP | 0289414 A3 | 2/1988 |
| EP | 0357013 A2 | 3/1990 |
| EP | 0357013 A3 | 3/1990 |
| EP | 0361456 A2 | 4/1990 |
| EP | 0361456 A3 | 4/1990 |
| EP | 0504583 | 9/1992 |
| EP | 0629834 A1 | 12/1994 |
| EP | 0631416 B1 | 12/1994 |
| EP | 0680103 A1 | 11/1995 |
| EP | 0875733 A2 | 11/1998 |
| EP | 0944888 B1 | 9/1999 |
| EP | 1306687 A2 | 5/2003 |
| EP | 1443332 A1 | 8/2004 |
| EP | 0898180 B1 | 11/2004 |
| EP | 1580560 A1 | 9/2005 |
| EP | 1637898 A1 | 3/2006 |
| EP | 1662353 A1 | 5/2006 |
| EP | 1679524 A1 | 7/2006 |
| EP | 1850143 A1 | 10/2007 |
| EP | 2000814 | 12/2008 |
| EP | 2063229 | 5/2009 |
| EP | 2402719 22 | 1/2012 |
| EP | 2466265 A2 | 6/2012 |
| EP | 2730893 | 5/2014 |
| EP | 3410075 A1 | 12/2018 |
| FR | 2748105 | 10/1997 |
| FR | 2909756 | 6/2008 |
| GB | 2135060 | 8/1984 |
| GB | 2276727 | 10/1994 |
| GB | 2481482 | 12/2011 |
| JE | H 10318784 | 12/1998 |
| JP | 6148777 | 3/1986 |
| JP | S 6367583 | 3/1988 |
| JP | 363084176 A | 4/1988 |
| JP | 63263782 | 10/1988 |
| JP | 63300911 | 12/1988 |
| JP | H 02116753 | 5/1990 |
| JP | H 02149013 | 6/1990 |
| JP | H 0329817 | 2/1991 |
| JP | H 04095817 | 3/1992 |
| JP | 04152688 | 5/1992 |
| JP | H 06273437 | 9/1994 |
| JP | 0897486 | 4/1996 |
| JP | H 08511348 | 11/1996 |
| JP | 09166612 | 6/1997 |
| JP | 1038988 | 2/1998 |
| JP | 10332725 | 12/1998 |
| JP | 1174142 | 3/1999 |
| JP | 11064363 | 3/1999 |
| JP | 2000-183241 | 6/2000 |
| JP | 2001-043475 | 2/2001 |
| JP | 2001-141738 | 5/2001 |
| JP | 2001-153683 | 6/2001 |
| JP | 2001-165702 | 6/2001 |
| JP | 2001-1659951 | 6/2001 |
| JP | 2002-117500 | 4/2002 |
| JP | 2002-149013 | 5/2002 |
| JP | 2002-357920 | 12/2002 |
| JP | 2003-042709 | 2/2003 |
| JP | 2003-177171 | 6/2003 |
| JP | 2003-202365 A | 7/2003 |
| JP | 2004-055932 | 2/2004 |
| JP | 2004-093381 | 3/2004 |
| JP | 2004-152688 | 5/2004 |
| JP | 2004-356338 | 12/2004 |
| JP | 2004-357858 | 12/2004 |
| JP | 2005-517928 | 6/2005 |
| JP | 2005-241269 | 9/2005 |
| JP | 2005-337866 | 12/2005 |
| JP | 2005-345302 | 12/2005 |
| JP | 2006-003096 | 1/2006 |
| JP | 2006-3116 A | 1/2006 |
| JP | 2006/098059 | 4/2006 |
| JP | 2006-275764 | 10/2006 |
| JP | 2007-012582 A | 1/2007 |
| JP | 2007-218799 | 8/2007 |
| JP | 2007-240202 | 9/2007 |
| JP | 2008-264569 | 11/2008 |
| JP | 2008-286667 A | 11/2008 |
| JP | 2009-002911 A | 1/2009 |
| JP | 2009-150732 | 7/2009 |
| JP | 2009-222524 | 10/2009 |
| JP | 2009-250725 A | 10/2009 |
| JP | 2009-250931 A | 10/2009 |
| JP | 2010-014607 | 1/2010 |
| JP | 2010-078366 | 4/2010 |
| JP | 2012-501446 A | 1/2012 |
| WO | WO 88/09026 | 11/1988 |
| WO | WO 93/012403 | 6/1993 |
| WO | WO 94/08203 | 4/1994 |
| WO | WO 94/29672 | 12/1994 |
| WO | WO 95/18982 | 7/1995 |
| WO | WO 96/02849 | 2/1996 |
| WO | WO 98/010302 | 3/1998 |
| WO | WO 9854547 | 12/1998 |
| WO | WO 99/49322 | 9/1999 |
| WO | WO 00/002266 | 1/2000 |
| WO | WO 01/74139 A2 | 10/2001 |
| WO | WO 01/74139 A3 | 10/2001 |
| WO | WO 03/036732 | 5/2003 |
| WO | WO 03/069358 A2 | 8/2003 |
| WO | WO 03/069358 A3 | 8/2003 |
| WO | WO 03/107018 | 12/2003 |
| WO | WO 2004/025742 | 3/2004 |
| WO | WO 2004/027436 | 4/2004 |
| WO | WO 2004/072672 | 8/2004 |
| WO | WO 2005/013363 | 2/2005 |

(56) References Cited

FOREIGN PATENT DOCUMENTS

| | | |
|---|---|---|
| WO | WO 2006/056829 | 6/2006 |
| WO | WO 2006/074989 | 7/2006 |
| WO | WO 2006/083479 | 8/2006 |
| WO | WO 2007/033168 A1 | 3/2007 |
| WO | WO 2007/095971 | 8/2007 |
| WO | WO 2007/138508 | 12/2007 |
| WO | WO 2008/008140 A2 | 1/2008 |
| WO | WO 2008/008140 A3 | 1/2008 |
| WO | WO 2008/048379 | 4/2008 |
| WO | WO 2008/121443 | 10/2008 |
| WO | WO 2008 145662 | 12/2008 |
| WO | WO 2009030361 | 3/2009 |
| WO | WO 2009/108422 A2 | 9/2009 |
| WO | WO 2009/108422 A3 | 9/2009 |
| WO | WO 2009/124969 | 10/2009 |
| WO | WO 2010/014309 | 2/2010 |
| WO | WO 2010/027658 | 3/2010 |
| WO | WO 2010/065315 | 6/2010 |
| WO | WO 2010/096367 | 8/2010 |
| WO | WO 2011/011479 | 1/2011 |
| WO | WO 2012/148646 | 11/2012 |
| WO | WO 2013/169455 | 11/2013 |
| WO | WO 2015/009532 A1 | 1/2015 |
| WO | WO 2015/058733 A1 | 4/2015 |

OTHER PUBLICATIONS

Ahn et al., "A New Toroidal-Meander Type Integrated Inductor With A Multilevel Meander Magnetic Core", IEEE Transactions on Magnetics, vol. 30, No. 1, Jan. 1994, 7 pages.
Allegro MicroSystems, Inc.; "3212 Data Sheet: Micropower, Ultra-Sensitive Hall-Effect Switch", published Sep. 22, 2004; 12 pages.
Allegro MicroSystems, Inc.; "3235 Data Sheet: Dual-Output Hall-Effect Switch", http://www.datasheetcatalog.org/datasheets/90/205047_DS.pdf; downloaded Sep. 29, 2010; 6 pages.
Allegro MicroSystems, Inc.; "3425 Data Sheet: Dual, Chopper-Stabilized, Ultra-Sensitive Bipolar Hall-Effect Switch", published Jun. 28, 2002; 10 pages.
Allegro MicroSystems, Inc.; "27701-AN Data Sheet: Hall-Effect IC Applications Guide", Application Information, Rev. 2; http://www.allegromicro.com/en/products/design/hall-effect-sensor-ic-applications-guide/AN27701.pdf; downloaded Sep. 29, 2010; 40 pages.
Allegro MicroSystems, Inc.; "A1140/41/42/43 Data Sheet: Sensitive Two-Wire Chopper-Stabilized Unipolar Hall-Effect Switches", published Sep. 9, 2004; 10 pages.
Allegro MicroSystems, Inc.; "A1174 Data Sheet: Ultrasensitive Hall Effect Latch with Internally or Externally Controlled Sample and Sleep Periods for Track Ball and Scroll Wheel Applications", published Jul. 25, 2008; 13 pages.
Allegro MicroSystems, Inc.; "A1230 Data Sheet: Ultra-Sensitive Dual-Channel Quadrature Hall-Effect Bipolar Switch", published Mar. 26, 2010; 16 pages.
Allegro MicroSystems, Inc. "A1341 Data Sheet: High Precision, Highly Programmable Linear Hall Effect Sensor IC with EEPROM, Output Protocols SENT and PWM, and Advanced Output Linearization Capabilities", May 17, 2010; 46 pages.
Allegro MicroSystems, Inc.; "A1351 Data Sheet: High Precision Linear Hall Effect Sensor with a Push/Pull, Pulse Width Modulated Output", published Mar. 7, 2008; 23 pages.
Allegro MicroSystems, Inc., "A1354 Data Sheet: High Precision 2-Wire Linear Hall Effect Sensor IC with a Pulse Width Modulated Output", 22 pages.
Allegro MicroSystems, Inc.; "A1356 Data Sheet: High Precision Linear Hall-Effect Sensor with an Open Drain Pulse Width Modulated Output", 20 pages.
Allegro MicroSystems, Inc.; "A1360, A1361 and A1362 Data Sheet: Low-Noise Programmable Linear Hall Effect Sensors with Adjustable Bandwidth (50 kHz Maximum) and Analog Output", published Mar. 18, 2008; 25 pages.
Allegro MicroSystems, Inc. "Data Sheet ATS601LSG: Non-TPOS, Tooth Detecting Speed Sensor", Nov. 1, 2011; 9 pages.
Allegro "True Zero-Speed Low-Jitter High Accuracy Gear Tooth Sensor", ATS625LSG; 2005; Allegro MicroSystems, Inc. Worcester, MA 01615; 21 pages.
Allegro MicroSystems, Inc. "ATS645LSH Data Sheet: Two-Wire True Zero Speed Miniature Differential Peak-Detecting Gear Tooth Sensor",2004; Allegro MicroSystems, Inc., Worcester, MA 01615; 14 pages.
Allegro MicroSystems, Inc.; "ATS675LSE Data Sheet: Self-Calibrating TPOS Speed Sensor Optimized for Automotive Cam Sensing Applications", published Jul. 11, 2008; 13 pages.
Allegro MicroSystems, Inc., "Gear-Tooth Sensor For Automotive Applications", Aug. 3, 2001, 2 pages.
Allegro MicroSystems, Inc., "Hall-Effect IC Applications Guide", http://www.allegromicro.com/en/Products/Design/an/an27701.pdf, Copyright 1987, 1997, 36 pages.
Atherton et al.; "Sensor Signal Conditioning—an IC Designer's Perspective", IEEE Electro International; Apr. 26-28, 1991; 6 pages.
Ausserlechner et al.; "Compensation of the Piezo-Hall Effect in Integrated Hall Sensors on (100)-Si", IEEE Sensors Journal, vol. 7, No. 11; Nov. 2007; ISBN: 1530-437X; 8 pages.
Ausserlechner et al.; "Drift of Magnetic Sensitivity of Small Hall Sensors Due to Moisture Absorbed by the IC-Package", Proceedings of IEEE Sensors, 2004; vol. 1; Oct. 24, 2004; ISBN:0-7803-8692-2; 4 pages.
Ausserlechner; "Limits of Offset Cancellation by the Principle of Spinning Current Hall Probe", Proceedings of IEEE Sensors; Oct. 2004; 4 pages.
Ausserlechner; "The piezo-Hall effect in n-silicon for arbitrary crystal orientation", Proceedings of IEEE Sensors; vol. 3; Oct. 24, 2004; ISBN: 0-7803-8692-2; 4 pages.
Austria Microsystems; "AS5040 datasheet; 10-Bit Programmable Magnetic Rotary Encoder", Revision 1.1; Jan. 2004; 20 pages.
Bahreyni, et al.; "A Resonant Micromachined Magnetic Field Sensor", IEEE Sensors Journal; vol. 7, No. 9, Sep. 2007; 9 pages.
Banjevic et al.; "2D CMOS Integrated Magnetometer Based on the Miniaturized Circular Vertical Hall Device" International Solid-State Sensors, Actuators and Microsystems Conference; Transducers; Jun. 21-25, 2009; pp. 4 pages.
Banjevic; "High Bandwidth CMOS Magnetic Sensors Based on the Miniaturized Circular Vertical Hall Device" Sep. 2011; 153 pages.
Barrettino, et al.; "CMOS-Based Monolithic Controllers for Smart Sensors Comprising Micromembranes and Microcantilevers" IEEE Transactions on Circuits and Systems-I Regular Papers vol. 54, No. 1; Jan. 2007; 12 pages.
Baschirotto et al.; "Development and Analysis of PCB Vector 2-D Magnetic Field Sensor System for Electronic Compass" IEEE Sensors Journal vol. 6, No. 2; Apr. 2006; 7 pages.
Bilotti et al.; "Monolithic Magnetic Hall Sensor Using Dynamic Quadrature Offset Cancellation;" IEEE Journal of Solid-State Circuits; vol. 32, Issue 6; Jun. 1997; 8 pages.
Blanchard et al.; "Cylindrical Hall Device;" International Electron Devices Meeting; Dec. 8-11, 1996; 4 pages.
Bosch, Robert, GMBH Stuttgart; "Active Sensor for ABS/ASR/VDC-Systems with 2-Wire-Current Interface;" Specification TLE4941/TLE4942; Version 5; Jul. 25, 2000; 44 pages.
Bowers et al.; "Microfabrication and Process Integration of Powder-Based Permanent Magnets;" Technologies for Future Micro-Nano Manufacturing Workshop; Aug. 2011; 4 pages.
Burger et al.; "New fully integrated 3-D silicon Hall sensor for precise angular-position measurements;" Sensors and Actuators, A 67; May 1998; 5 pages.
Daughton "Spin-Dependent Sensors" Proceedings of the IEEE, vol. 91, No. 5, May 2003; 6 pages.
Demierre, et al.; "Reference Magnetic Actuator for Self-Calibration of a Very Small Hall Sensor Array;" Sensors and Actuators A97-98; Apr. 2002; 8 pages.
Drljaca, et al.; "Nonlinear Effects In Magnetic Angular Position Sensor With Integrated Flux Concentrator;" Proc. $23^{rd}$ International Conference on Microelectronics (MIEL 2002); vol. 1; NIS; Yugoslavia; May 12-15, 2002; 4 pages.

(56) References Cited

OTHER PUBLICATIONS

Dwyer, "Back-Biased Packaging Advances (SE, SG & SH versus SA & SB)," http://www.allegromicro.com/en/Products/Design/packaging_advances/index.asp, Copyright 2008, 5 pages.
Dwyer; Allegro MicroSystems, Inc.; "AN296061 Data Sheet: Ring Magnet Speed Sensing for Electronic Power Steering;" published Jul. 21, 2009; 4 pages.
Freitas et al.; "Giant magnetoresistive sensors for rotational speed control;" Journal of Applied Physics, vol. 85, No. 8; Apr. 15, 1999; 3 pages.
Frick, et al.; "CMOS Microsystem for AC Current Measurement with Galvanic Isolation;" IEEE Sensors Journal; vol. 3, No. 6; Dec. 2003; 9 pages.
Gerhauser, H., "Intelligente 3D-Magnetfeld Sensorik;" Fraunhofer-Institut for Integrierte Schaltungen IIS; www.iis.fraunhofer.de/asic/analog; Oct. 2009; 12 pages.
Gilbert; "Technical Advances in Hall-Effect Sensing;" Allegro MicroSystems, Inc. Product Description; May 10, 2008; 7 pages.
Häberli et al.; "Contactless Angle Measurements by CMOS Magnetic Sensor with On Chip Read-Out Circuit;" The 8th International Conference on Solid-State Sensors and Actuators and Eurosensors IX; Jan. 25-29, 1995; 4 pages.
Häberli et al.; "Two-Dimensional Magnetic Microsensor with On-Chip Signal Processing for Contactless Angle Measurement;" IEEE Journal of Solid-State Circuits, vol. 31, No. 12; Dec. 1996; 6 pages.
Halg; "Piezo-Hall Coefficients of n-Type Silicon;" Journal of Applied Physics; vol. 64, No. 1; Jul. 1, 1988; 7 pages.
Hiligsmann et al.; "Monolithic 360 Degrees Rotary Position Sensor IC;"2004 IEEE Proceedings of Sensors, vol. 3; Oct. 24-27, 2004; 6 pages.
Honeywell International, Inc., "Hall Effect Sensing and Application", Micro Switch Sensing and Control, Chapter 3, http://content.honeywell.com/sensing/prodinfo/solidstate/technical/hallbook.pdf, date unavailable, 11 pages.
Hosticka; "CMOS Sensor Systems;" Sensors and Actuators A66; Apr. 1998; 7 pages.
Infineon Product Brief, TLE 4941plusC, "Differential Hall IC for Wheel Speed Sensing", Oct. 2010, www.infineon.com/sensors, 2 pages.
Infineon Technologies; "Differential Two-Wire Hall Effect Sensor IC;" TLE4942 Preliminary Data Sheet; Jun. 2000; 13 pages.
Johnson et al., "Hybrid Hall Effect Device," Appl. Phys. Lett., vol. 71, No. 7, Aug. 1997, 3 pages.
Kanda et al.; "The Piezo-Hall Effect in n-Silicon;" 22nd International Conference on the Physics of Semiconductors; vol. 1, Jan. 1995; 4 pages.
Kapser et al.; "Integrated GMR Based Wheel Speed Sensor for Automotive Applications;" IEEE 2007 Conference on Sensors; Oct. 2007; 4 pages.
Kejik et al.; "Circular Hall Transducer for Angular Position Sensing;" International Solid-State Sensors, Actuators and Microsystems Conference; Transducers; Jun. 2007; 4 pages.
Kejik, P. et al.; "Purely CMOS Angular Position Sensor Based on a New Hall Microchip;" 34th Annual Conference of IEEE Industrial Electronics; IECON; Nov. 10-13, 2008; 5 pages.
Kejik, P. et al.; "Ultra Low-Power Angular Position Sensor for High-Speed Portable Applications;" 2009 IEEE Sensors Conference; Oct. 25-28, 2009; 4 pages.
Krammerer et al.: "A Hall effect sensors network insensitive to mechanical stress;" Proceedings of IEEE Sensors; vol. 3, Oct. 2004; 4 pages.
Lagorce et al.; "Magnetic and Mechanical Properties of Micromachined Strontium Ferrite/Polyimide Composites;" Journal of Microelectromechanical Systems; vol. 6, No. 4; Dec. 1997; 15 pages.
Lequesne et al.; "High-Accuracy Magnetic Position Encoder Concept;" IEEE Transactions on Industry Applications; vol. 35, No. 3; May/Jun. 1999; 9 pages.
Lou Law; "Angular Position Sensing with 2-Axis Hall ICs;" Sensors Magazine, vol. 20, No. 3; Mar. 2003; 7 pages.

Magnani et al.; "Mechanical Stress Measurement Electronics Based on Piezo-Resistive and Piezo-Hall Effects;" 9th International Conference on Electronics, Circuits and Systems 2002; vol. 1; SBN: 0-7803-7596-3; Dec. 2002; 4 pages.
Manic; "Drift in Silicon Integrated Sensors and Circuits Due to the Thermo-Mechanical Stresses;" Lausanne, École Polytechnique Fédérale De Lausanne 2000; Part 1 of 2; 74 pages.
Manic; "Drift in Silicon Integrated Sensors and Circuits Due to the Thermo-Mechanical Stresses;" Lausanne, École Polytechnique Fédérale De Lausanne 2000; Part 2 of 2; 102 pages.
Manic; "Short and Long-Term Stability Problems of Hall Plates in Plastic Packages;" IEEE 38th Annual International Reliability Physics Symposium; Apr. 2000; 6 pages.
Masson et al.; "Multiturn and high precision through-shaft magnetic sensors;" Sensor + Text Conference; Proceedings II; May 2009; 6 pages.
Melexis Microelectronic Integrated Systems; MLX90333; "Triaxis 3D-Joystick Position Sensor;" Data Sheet; Mar. 2009; 43 pages.
Melexis Microelectronic Systems, Hall Applications Guide, Section 3—Applications,1997, 48 pages.
Melexis MLX 90324; ""Under-the-Hood" Triaxis Rotary Position feat. SENT Protocol;" 3901090324 Data Sheet; Dec. 2008; 40 pages.
Memsic Corporation; AN-00MM-001; "Magnetometer Fundamentals;" Jun. 2008; 6 pages.
Memsic Corporation; AN-00MM-002; "Magnetometer Soldering Methodology;" Jun. 2008; 2 pages.
Memsic Corporation; AN-00MM-003; "Magnetic Sensor Calibration;" Mar. 2008; 5 pages.
Memsic Corporation; AN-00MM-004; "Electronic Tilt Compensation;" Mar. 2008; 5 pages.
Memsic Corporation; AN-00MM-005; "Magnetic Sensor Placement Guidelines;" Oct. 2008; 2 pages.
Memsic Corporation; MMC312xMQ; "Tri-axis Magnetic Sensor, with $I^2C$ Interface;" Aug. 14, 2008; 9 pages.
Memsic Corporation; MMC314xMQ; "Ultra Small 3-axis Magnetic Sensor, with $I^2C$ Interface;" Mar. 31, 2010; 8 pages.
Metz et al.; "Contactless Angle Measurement Using Four Hall Devices on Single Chip;"; International Conference on Solid State Sensors and Actuators; Transducers; vol. 1; Jun. 16-19, 1997; 4 pages.
Micronas GmbH; "HAL®3625 Programmable Direct Angle Sensor;" Product Information; Sep. 2009; 2 pages.
Motz, et al.; "An Integrated Hall Sensor Platform Design for Position, Angle and Current Sensing;" IEEE Sensors 2006; Exco, Daegu, Korea / Oct. 22-25, 2006; 4 pages.
Motz et al.; "An Integrated Magnetic Sensor with Two Continuous-Time $\Delta\Sigma$-Converters and Stress Compensation Capability;" IEEE International Solid-State Circuits Conference; Digest of Technical Papers; Feb. 6, 2006; ISBN: 1-4244-0079-1; 7 pages.
Motz, et al.; "A Chopped Hall Sensor with Small Jitter and Programmable "True Power-On" Function;" IEEE Journal of Solid-State Circuits; vol. 40, No. 7; Jul. 2005; 8 pages.
Munter; "A Low-offset Spinning-current Hall Plate;" Sensors and Actuators, vol. A21-A23; Jan. 1990; 4 pages.
Munter; "Electronic Circuitry for a Smart Spinning-current Hall Plate with Low Offset;" Sensors and Actuators A; Jun. 1991;.5 pages.
Novotechnik Siedle Group; "How New Angular Positioning Sensor Technology Opens a Broad Range of New Applications;" Vert-X Technology; Dec. 2001; 5 pages.
Oniku et al., "High-Energy-Density Permanent Micromagnets Formed From Heterogeneous Magnetic Powder Mixtures", Interdisciplinary Microsystems Group, Dept. of Electrical and Computer Engineering, University of Florida, Gainesville, FL 32611, USA; Preprint of MEMS 2012 Conf. Paper, 4 pages.
Paranjape et al.; "A CMOS-compatible 2-D vertical Hall magnetic-field sensor using active carrier confinement and post-process micromachining;" The 8th International Conference on Solid-State Sensors and Actuators, Physical vol. 53, Issues 1-3; May 1996; 6 pages.

(56) References Cited

OTHER PUBLICATIONS

Park et al.: "Batch-Fabricated Microinductors with Electroplated Magnetically Anisotropic and Laminated Alloy Cores", IEEE Transactions on Magnetics, vol. 35, No. 5, Sep. 1999, 10 pages.
Park et al.; "Ferrite-Based Integrated Planar Inductors and Transformers Fabricated at Low Temperature;" IEEE Transactions on Magnetics; vol. 33, No. 5; Sep. 1997; 3 pages.
Partin et al.; "Temperature Stable Hall Effect Sensors;" IEEE Sensors Journal, vol. 6, No. 1; Feb. 2006; 5 pages.
Pastre, et al.; "A Hall Sensor Analog Front End for Current Measurement with Continuous Gain Calibration;" IEEE Sensors Journal; vol. 7, No. 5; May 2007; 8 pages.
Pastre, et al.; "A Hall Sensor-Based Current Measurement Microsystem With Continuous Gain Calibration;" Research in Microelectronics and Electronics, IEEE vol. 2; Jul. 25; 2005; ISBN: 0-7803-9345-7; 4 pages.
Petoussis et al.; "A Novel Hall Effect Sensor Using Elaborate Offset Cancellation Method;" Sensors & Transducers Journal, vol. 100, Issue 1; Jan. 2009; 7 pages.
Petrie; "Circular Vertical Hall Magnetic Field Sensing Element and Method with a Plurality of Continuous Output Signals;" U.S. Appl. No. 13/035,243, filed Feb. 25, 2011; 56 pages.
Popovic; "Not-plate-like Hall magnetic sensors and their applications;" Sensors and Actuators A: Physical, vol. 85, Issues 1-3; Aug. 2000; 9 pages.
Popovic; "Sensor Microsystems;" Proc. 20$^{th}$ International Conference on Microelectronics (MWIL 95); vol. 2, NIS, Serbia, 12-14; Sep. 1995; 7 pages.
Randhawa; "Monolithic Integrated Hall Devices in Silicon Circuits;" Microelectronics Journal; vol. 12, No. 6; Sep. 14-17, 1981; 6 pages.
Reymond, S. et al.; "True 2D CMOS Integrated Hall Sensor," 2007 IEEE Sensors Conference; Oct. 28-31, 2007; 4 pages.
Roumenin et al.; "Vertical Hall Effect Devices in the Basis of Smart Silicon Sensors;" IEEE Workshop on Intelligent Data Acquisition and Advanced Computing Systems: Technology and Applications; Sep. 5-7, 2005; 4 pages.
Roumenin; "Magnetic sensors continue to advance towards perfection;" Sensors and Actuators A: Physical, vol. 46-47, Issues 1-3; Jan.-Feb. 1995; 7 pages.
Ruther et al.; "Integrated CMOS-Based Sensor Array for Mechanical Stress Mapping;" 5$^{th}$ IEEE Conference on Sensors, Oct. 2007; 4 pages.
Ruther et al.; "Thermomagnetic Residual Offset in Integrated Hall Plates;" IEEE Sensors Journal; vol. 3, No. 6; Dec. 2003; 7 pages.
Sargent; "Switched-capacitor IC controls feedback loop;" EDN; Design Ideas; Feb. 17, 2000; 2 pages.
Schneider et al.; "Temperature Calibration of CMOS Magnetic Vector Probe for Contactless Angle Measurement System;" International Electron Devices Meeting; Dec. 8-11, 1996; 4 pages.
Schott et al.; "Linerarizing Integrated Hall Devices;" 1997 International Conference on Solid-State Sensors and Actuators, Jun. 16-19, 1997; 4 pages.
Schott, et al.; "CMOS Single-Chip Electronic Compass with Microcontroller;" IEEE Journal of Solid-State Circuits; vol. 42, No. 12; Dec. 2007; 11 pages.
SENSIMA technology sa; "CVHD: a new concept of Angular Position Sensor;" Slide Presentation for Allegro MicroSystems; Mar. 2009; 17 pages.
Sentron; AN-101; "Angular position sensing with 2-Axis Hall IC 2SA-10;" Feb. 12, 2004; http://www.diegm.uniud.it/petrella/Azionamenti%20Elettrici%20II/Sensori%20e%20trasduttori/Data%20Sheet%20-%202SA-10.pdf; 7 pages.
Simon et al.; "Autocalibration of Silicon Hall Devices;" 8$^{th}$ International Conference on Solid-State Sensors and Actuators; vol. 2; Jun. 25, 1995; 4 pages.
Smith et al.; "Low Magnetic Field Sensing with GMR Sensors;" Sensor Magazine; Part 1; Sep. 1999; http://archives.sensorsmag.com/articles/0999/76mail.shtml; 8 pages.
Smith et al.; "Low Magnetic Field Sensing with GMR Sensors;" Sensor Magazine; Part 2; Oct. 1999; http://archives.sensorsmag.com/articles/1099/84/mail.shtml; 11 pages.
Steiner et al.; "Double-Hall Sensor with Self-Compensated Offset;" International Electron Devices Meeting; Dec. 7, 1997; ISBN: 0-7803-4100-7; 4 pages.
Steiner et al.; "Offset Reduction in Hall Devices by Continuous Spinning Current Method" Sensors and Actuators A66; 1998; 6 pages.
Stellrecht et al.; Characterization of Hygroscopic Swelling Behavior of Mold Compounds and Plastic Packages; IEEE Transactions on Components and Packaging Technologies; vol. 27, No. 3; Sep. 2004; 8 pages.
Tian et al.; "Multiple Sensors on Pulsed Eddy-Current Detection for 3-D Subsurface Crack Assessment;" IEEE Sensors Journal, vol. 5, No. 1; Feb. 2005; 7 pages.
Trontelj et al.; "CMOS Integrated Magnetic Field Source Used as a Reference in Magnetic Field Sensors on Common Substrate;" WEP 1-6; IMTC; May 1994; 3 pages.
Van der Meer; et al.; "CMOS quad spinning-current Hall-sensor system for compass application;" IEEE Proceedings of Sensors, vol. 3; Oct. 24-27, 2004; 4 pages.
Vogelgesang et al.; Robert Bosch GmbH; "GMR sensors in automotive application;" CS-SNS/ECS Slides Presentation; Mar. 2, 2005; 16 pages.
Voider; "The CORDIC Trigonometric Computing Technique;" The Institute of Radio Engineers, Inc.; IRE Transactions on Electronic Computers, vol. EC, Issue 3; Sep. 1959; 5 pages.
Wu, et al.; "A Chopper Current-Feedback Instrumentation Amplifier with a 1mHz 1/f Noise Corner and an AC-Coupled Ripple-Reduction Loop;" IEEE International Solid-State Circuits Conference; Feb. 10, 2009; 3 pages.
Zou et al.; "Three-Dimensional Die Surface Stress Measurements in Delaminated and Non-Delaminated Plastic Packages;" 48th Electronic Components and Technology Conference; May 25, 1998; 12 pages.
Invitation to Pay Additional fees dated Oct. 2, 2003 for PCT Pat. App. No. PCT/US03/02489; 3 pages.
PCT Search Report dated Nov. 19, 2003 for PCT Pat. App. No. PCT/US03/02489; 9 pages.
EP Board of Appeals Datasheet for the Decision dated Nov. 22, 2007; for European Pat. App. No. 97108803.4; 22 pages.
EP Communication for the Board of Appeals dated Apr. 30, 2009; for European Pat. App. No. 03 710 766.1; 2 pages.
EP Preliminary Opinion from the Board of Appeal dated May 26, 2009; for European Pat. App. No. 03 710 766.1; 52 pages.
Letter from Yuasa and Hara dated Jun. 4, 2008; Japanese First Office Action dated Apr. 7, 2008; for JP Pat. App. No. 2003-568426; 5 pages.
Letter from Yuasa and Hara dated Oct. 21, 2008; Japanese Response to First Office Action filed Sep. 22, 2008; for JP Pat. App. No. 2003-568426; 14 pages.
Letter from Yuasa and Hara dated Dec. 12, 2008; Japanese Second Office Action; for JP Pat. App. No. 2003-568426; 4 pages.
Letter from Yuasa and Hara dated Apr. 23, 2009; Japanese Response to Second Office Action filed Mar. 25, 2009; for JP Pat. App. No. 2003-568426; 8 pages.
Letter from Yuasa and Hara dated Jun. 9, 2011; Japanese Response to Third Office Action filed May 13, 2011; for JP Pat. App. No. 2003-568426; 27 pages.
JP Notice of Allowance dated Nov. 8, 2011; for Japanese Pat. App. No. 2003-568426; 3 pages.
PCT Search Report and Written Opinion of the ISA dated Jul. 15, 2008 for PCT/US2008/053551; 11 pages.
PCT International Preliminary Report on Patentability for PCT/US2008/053551; dated Oct. 8, 2009; 8 pages.
CN Office Action (with English translation) dated Sep. 10, 2010; for Chinese Pat. App. No. 200880008895.6; 14 pages.
Letter from NTD Patent & Trademark Agency Limited Regarding Office Action dated Oct. 13, 2010; for Chinese Pat. App. No. 200880008895.6; 2 pages.
CN Response to Office Action received Mar. 28, 2011; for Chinese Pat. App. No. 200880008895.6; 7 pages.

(56) References Cited

OTHER PUBLICATIONS

CN Notice of Allowance (with English translation) dated Jul. 4, 2011; for Chinese Pat. App. No. 200880008895.6; 4 pages.
JP First Office Action (English translation) received Jun. 11, 2012; for Japanese Pat. App. No. 2010-501028; 7 pages.
JP Response to First Office Action (with English translation) received Oct. 16, 2012; for Japanese Pat. App. No. 2010-501028; 12 pages.
JP Second Office Action (English translation) received Aug. 7, 2013; for Japanese Pat. App. No. 2010-501028; 7 pages.
Office Action/Restriction Requirement dated May 14, 2010; for U.S. Appl. No. 12/037,393; 6 pages.
Response to Office Action/Restriction Requirement filed on Jun. 2, 2010; for U.S. Appl. No. 12/037,393; 1 page.
Office Action dated Jun. 30, 2010; for U.S. Appl. No. 12/037,393; 11 pages.
Response to Office Action filed Oct. 14, 2010; for U.S. Appl. No. 12/037,393; 34 pages.
Notice of Allowance dated Nov. 3, 2010; for U.S. Pat. U.S. Appl. No. 12/037,393; 7 pages.
Request for Continued Examination dated Jan. 26, 2011; for U.S. Appl. No. 12/037,393; 1 page.
Notice of Allowance dated Feb. 11, 2011; for U.S. Appl. No. 12/037,393; 6 pages.
Search Report dated Oct. 23, 2009 for PCT Application No. PCT/US2009/031776; 20 pages.
International Preliminary Report on Patentability dated Sep. 10, 2010 for Application No. PCT/US2009/031776; 10 pages.
CN First Office Action (with English translation) dated Aug. 29, 2012; for Chinese Pat. App. No. 200980106535.4; 8 pages.
CN Response to Chinese First Office Action with English claims dated Aug. 29, 2012 filed on Jan. 24, 2013; for Chinese Pat. App. No. 200980106535.4; 20 pages.
Letter from NTD Patent and Trademark Office dated Oct. 10, 2012; for Chinese Pat. App. No. 200980106535.4; 2 pages.
Letter to NTD Patent and Trademark Office dated Dec. 11, 2012; for Chinese Pat. App. No. 200980106535.4; 3 pages.
Letter from NTD Patent and Response filed dated Jan. 19, 2013; for Chinese Pat. App. No. 200980106535.4; 13 pages.
CN Second Office Action (with English translation) dated Apr. 15, 2013; for Chinese Pat. App. No. 200980106535.4; 9 pages.
Letter from NTD Patent and Trademark Office dated May 21, 2013; for Chinese Pat. App. No. 200980106535.4; 2 pages.
Letter to NTD Patent and Trademark Agency dated Jun. 19, 2013; for Chinese Pat. App. No. 200980106535.4; 11 pages.
Letter from NTD Patent and Trademark Agency dated Jul. 11, 2013; for Chinese Pat. App. No. 200980106535.4; 1 page.
JP Notice of Reasons for Rejection (English translation) dated Apr. 4, 2013 for Japanese Pat. App. No. 2010-547666; 4 pages.
Letter from Yuasa and Hara dated May 27, 2013; for Japanese Pat. App. No. 2010-547666; 2 pages.
Response to Reason for Rejection with English claims filed Jul. 3, 2013; for Japanese Pat. App. No. 2010-547666; 11 pages.
JP Notice of Reasons for Rejection (English translation) dated Sep. 29, 2014 for Japanese Pat. App. No. 2010-547666; 8 pages.
Response to Reason for Rejection with English claims filed Jan. 27, 2015; for Japanese Pat. App. No. 2010-547666; 10 pages.
Office Action dated Feb. 2, 2011; for U.S. Pat. U.S. Appl. No. 12/959,672; 13 pages.
Response to Office Action filed on May 24, 2011; for U.S. Pat. U.S. Appl. No. 12/959,672; 8 pages.
Notice of Allowance dated Jun. 27, 2011; for U.S. Appl. No. 12/959,672; 8 pages.
Request for Continued Examination dated Jul. 13, 2011; for U.S. Appl. No. 12/959,672; 2 pages.
Notice of Allowance dated Jul. 19, 2011; for U.S. Appl. No. 12/959,672; 8 pages.
Office Action dated May 12, 2011; for U.S. Appl. No. 12/183,367; 17 pages.
Response to Office Action filed on Aug. 10, 2011; for U.S. Appl. No. 12/183,367; 13 pages.
Office Action dated Oct. 20, 2011; for U.S. Appl. No. 12/183,367; 9 pages.
Response to Office Action filed on Jan. 17, 2012; for U.S. Appl. No. 12/183,367; 15 pages.
Office Action/Restriction Requirement dated Apr. 12, 2012; for U.S. Appl. No. 12/183,367; 6 pages.
Response to Restriction Requirement filed on May 9, 2012; for U.S. Appl. No. 12/183,367; 2 pages.
Supplemental Response to Office Action/Restriction Requirement filed on Feb. 11, 2013; for U.S. Appl. No. 12/183,367;2 pages.
Final Office Action dated May 2, 2013; for U.S. Appl. No. 12/183,367; 15 pages.
Response to Final Office Action filed on Jun. 19, 2013; for U.S. Appl. No. 12/183,367; 8 pages.
Final Office Action dated Jul. 1, 2013; for U.S. Appl. No. 12/183,367; 7 pages.
Final Office Action dated Jul. 23, 2013; for U.S. Appl. No. 12/183,367; 8 pages.
Response to Office Action filed on Aug. 27, 2013; for U.S. Appl. No. 12/183,367; 13 pages.
Notice of Allowance dated Sep. 6, 2013; for U.S. Appl. No. 12/183,367; 7 pages.
Office Action/Restriction Requirement dated Oct. 23, 2009; for U.S. Appl. No. 12/328,798; 7 pages.
Response to Office Action/Restriction Requirement filed on Nov. 4, 2009; for U.S. Appl. No. 12/328,798; 1 page.
Office Action dated Dec. 14, 2009; for U.S. Appl. No. 12/328,798; 15 pages.
Response to Office Action filed on Jan. 28, 2010; for U.S. Appl. No. 12/328,798; 22 pages.
Final Office Action dated May 24, 2010; for U.S. Appl. No. 12/328,798; 20 pages.
Response to Final Office Action filed Jul. 21, 2010 for U.S. Appl. No. 12/328,798; 23 pages.
Office Action dated Oct. 31, 2011; for U.S. Appl. No. 12/328,798; 12 pages.
Response to Office Action filed on Feb. 28, 2012; for U.S. Appl. No. 12/328,798; 15 pages.
Final Office Action dated May 10, 2012; for U.S. Appl. No. 12/328,798; 13 pages.
Response to Final Office Action filed on Oct. 9, 2012; for U.S. Appl. No. 12/328,798; 6 pages.
Notice of Allowance dated Oct. 26, 2012; for U.S. Appl. No. 12/328,798; 13 pages.
Request for Continued Examination filed on Jan. 24, 2013; for U.S. Appl. No. 12/328,798; 2 pages.
Notice of Allowance dated Mar. 1, 2013; for U.S. Appl. No. 12/328,798; 10 pages.
Office Action dated Feb. 22, 2012; for U.S. Appl. No. 13/241,380; 14 pages.
Response to Office Action filed on May 3, 2012; for U.S. Appl. No. 13/241,380; 16 pages.
Final Office Action dated Jul. 19, 2012; for U.S. Appl. No. 13/241,380; 13 pages.
Response to Final Office Action dated Oct. 9, 2012; for U.S. Appl. No. 13/241,380; 6 pages.
Notice of Allowance dated Oct. 29, 2012; for U.S. Appl. No. 13/241,380; 11 pages.
Request for Continued Examination dated Jan. 24, 2013; for U.S. Appl. No. 13/241,380; 3 pages.
Notice of Allowance dated Feb. 21, 2013; for U.S. Appl. No. 13/241,380; 9 pages.
Office Action dated Jul. 6, 2012; for U.S. Appl. No. 12/706,318; 29 pages.
Response to Office Action filed Sep. 27, 2012; for U.S. Appl. No. 12/706,318; 12 pages.
Supplemental Response to Office Action filed on Oct. 2, 2012; for U.S. Appl. No. 12/706,318; 12 pages.
Notice of Allowance dated Dec. 10, 2012; for U.S. Appl. No. 12/706,318; 9 pages.
Letter under 37 C.F.R. §1.56 filed Jul. 25, 2013 for U.S. Appl. No. 13/946,380; 2 pages.

(56) References Cited

OTHER PUBLICATIONS

Non-Final Office Action dated Jul. 9, 2015; for U.S. Appl. No. 13/946,380; 31 pages.
Amendment in response to Office Action dated Jul. 9, 2015 filed on Nov. 9, 2015 for U.S. Appl. No. 13/946,380; 26 pages.
Final Office Action dated Dec. 15, 2015; For U.S. Appl. No. 13/946,380; 36 pages.
Amendment in response to Final Office Action dated Dec. 15, 2015 and filed on Apr. 12, 2016 for U.S. Appl. No. 13/946,380; 17 pages.
Non-Final Office Action dated Aug. 26, 2016 for U.S. Appl. No. 13/946,380; 40 pages.
Response filed on Nov. 9, 2016 to the Non-Final Office Action dated Aug. 26, 2016; for U.S. Appl. No. 13/946,380; 19 pages.
Final Office Action dated Jan. 12, 2017 for U.S. Appl. No. 13/946,380; 32 pages.
Amendment filed on Apr. 11, 2017 for U.S. Appl. No. 13/946,380; 18 pages.
Non-Final Office Action for U.S. Appl. No. 13/946,380 dated May 19, 2017; 20 pages.
Amendment for U.S. Appl. No. 13/946,380, filed Jun. 22, 2017; 8 pages.
Notice of Allowance dated Jul. 13, 2017 for U.S. Appl. No. 13/946,380; 11 pages.
Amendment Under 37 C.F.R. §1.312 for U.S. Appl. No. 13/946,380, filed Aug. 29, 2017; 3 pages.
DCMD Instruction letter regarding filing regarding Request for Examination dated Feb. 13, 2019 for KR Pat. Appl. No. 10-2016-7004180; 2 pages.
21st Century Letter dated Mar. 14, 2019 regarding Voluntary Amendment and Substantive Examination for KR Pat. Appl. No. 10-2016-7004180; 1 page.
21st Century Listing of Pending Claims filed on Mar. 14, 2019 regarding Voluntary Amendment and Substantive Examination for KR Pat. Appl. No. 10-2016-7004180; 13 pages.
Non-final office action dated Jan. 26, 2018 for U.S. Pat. U.S. Appl. No. 15/655,135; 49 pages.
Response to Non-Final Office Action dated Jan. 26, 2018 for U.S. Appl. No. 15/655,135; Response filed Apr. 3, 2018; 20 pages.
Final Office Action dated Jul. 26, 2018 for U.S. Appl. No. 15/655,135; 38 Pages.
Response to Final Office Action dated Jul. 26, 2018 for U.S. Appl. No. 15/655,135, filed Oct. 11, 2018; 21 Pages.
Request for Continued Examination dated Oct. 29, 2018 for U.S. Appl. No. 15/655,135; 3 Pages.
Notice of Allowance dated Dec. 4, 2018 or U.S. Appl. No. 15/655,135; 13 pages.
Supplemental Notice of Allowability dated Jan. 3, 2019 for U.S. Appl. No. 15/655,135; 9 pages.
Supplemental Notice of Allowability dated Jan. 30, 2019 for U.S. Appl. No. 15/655,135; 9 pages.
Supplemental Notice of Allowability dated Feb. 13, 2019 for U.S. Appl. No. 15/655,135; 9 pages.
Office Action dated Jul. 28, 2016 for U.S. Appl. No. 14/529,669; 25 pages.
Response to Office Action filed on Oct. 28, 2016 for U.S. Appl. No. 14/529,669; 18 pages.
Final Office Action dated Jan. 9, 2017 for U.S. Appl. No. 14/529,669; 11 pages.
Response to Final Office Action filed Mar. 30, 2017 for U.S. Appl. No. 14/529,669; 12 pages.
Notice of Allowance dated Apr. 20, 2017 for U.S. Appl. No. 14/529,669; 8 Pages.
Request for Continued Examination filed Apr. 24, 2017 for U.S. Appl. No. 14/529,669; 3 pages.
Notice of Allowance dated May 18, 2017 for U.S. Appl. No. 14/529,669; 8 pages.
Amendment under 37 C.F.R. §1.312 filed on Jun. 29, 2017 for U.S. Appl. No. 14/529,669; 11 pages.
Response to Rule 312 Communication from USPTO dated Jul. 28, 2017 for U.S. Appl. No. 14/529,669; 2 pages.

PCT International Search Report and Written Opinion of the ISA dated Dec. 23, 2015; For PCT App. No. PCT/US2015/055233; 12 pages.
PCT International Preliminary Report and Written Opinion dated May 11, 2017 for International Application No. PCT/US2015/055233; 8 Pages.
Allowed Specification dated May 6, 2016 for EP Pat. Appl. No. 15787099.9; 71 pages.
Examination report dated May 28, 2018 for European Application No. 15787099.9; 7 Pages.
Response to Examination report dated May 28, 2018 for European Application No. 15787099.9 as filed on Sep. 17, 2018; 15 Pages.
Notice of Intention to Grant dated May 27, 2019 for EP Pat. Appl. No. 15787099.9; 7 pages.
Reasons for Rejection with English translation dated Mar. 1, 2019 for JP Pat. Appl. No. 2017-522907; 9 pages.
Yuasa and Hara Letter dated Apr. 1, 2019 regarding Reasons for Rejection and English Claims for JP Pat. Appl. No. 2017-522907; 15 pages.
Response filed on May 29, 2019 for Japanese Patent Application No. 2017-522907 with English Translation; 40 Pages.
Notice of Allowance with English Allowed Claims dated Oct. 31, 2019 for Japanese Application No. 2017-522907; 17 pages.
Office Action dated Jul. 10, 2019 for U.S. Appl. No. 15/658,757; 23 pages.
Response to Office Action dated Sep. 23, 2019 for U.S. Appl. No. 15/658,757; 15 pages.
Final Office Action dated Nov. 21, 2019 for U.S. Appl. No. 15/658,757; 24 pages.
Response to Office Action and Request for Continued Examination (RCE) dated Jan. 17, 2020 for U.S. Appl. No. 15/658,757; 19 pages.
Office Action dated Feb. 12, 2020 for U.S. Appl. No. 15/658,757; 24 pages.
Partial European Search Report dated Dec. 4, 2019 for EP Application No. 19198294.1-1022, 13 Pages.
Office Action dated Oct. 24, 2019 for U.S. Appl. No. 16/136,844; 21 pages.
Response to Office Action filed Jan. 17, 2020 for U.S. Appl. No. 16/136,844; 14 pages.
Final Office Action dated Mar. 2, 2020 for U.S. Appl. No. 16/136,844; 22 pages.
Office Action dated Mar. 20, 2015; for U.S. Appl. No. 13/946,417; 54 pages.
Response to Office Action dated Mar. 20, 2015 and filed on Jun. 19, 2015; for U.S. Appl. No. 13/946,417; 15 pages.
Final Office Action dated Aug. 28, 2015; for U.S. Appl. No. 13/946,417; 34 pages.
Response to Final Office Action and Request for Continued Examination dated Nov. 9, 2015; For U.S. Appl. No. 13/946,417; 17 pages.
Non-Final Office Action dated Dec. 3, 2015; for U.S. Appl. No. 13/946,417; 29 pages.
Response to Office Action dated Dec. 3, 2015 and filed on Mar. 3, 2016; For U.S. Appl. No. 13/946,417; 17 pages.
Final Office Action dated Oct. 6, 2016; for U.S. Appl. No. 13/946,417; 45 pages.
Response to Final Office Action dated Oct. 6, 2016 from U.S. Appl. No. 13/946,417, filed Jan. 24, 2017; 14 Pages.
Office Action dated Mar. 15, 2017 from U.S. Appl. No. 13/946,417; 43 Pages.
Response to Office Action filed on Jun. 14, 2017 for U.S. Appl. No. 13/946,417; 10 pages.
Final Office Action dated Sep. 8, 2017 for U.S. Appl. No. 13/946,417; 56 pages.
Response (with RCE) to Final Office Action dated Sep. 8, 2017 for U.S. Appl. No. 13/946,417; Response with RCE filed Nov. 29, 2017; 16 pages.
Office Action dated Feb. 8, 2018 for U.S. Appl. No. 13/946,417; 37 Pages.
Response to Non-Final Office Action dated Feb. 8, 2018 for U.S. Appl. No. 13/946,417; Response filed on Apr. 19, 2018; 14 pages.
Final Office Action dated Jun. 15, 2018 for U.S. Appl. No. 13/946,417; 33 Pages.

(56) References Cited

OTHER PUBLICATIONS

Response to Final Office Action dated Jun. 15, 2018 for U.S. Appl. No. 13/946,417, filed Sep. 14, 2018; 15 Pages.
Office Action dated Feb. 7, 2019 for U.S. Appl. No. 13/946,417; 35 pages.
Response to Office Action dated Feb. 7, 2019 for U.S. Appl. No. 13/946,417; Response filed Apr. 22, 2019; 14 pages.
Notice of Allowance dated Sep. 11, 2019 for U.S. Appl. No. 13/946,417; 10 pages.
Supplemental Notice of Allowability dated Oct. 2, 2019 for U.S. Appl. No. 13/946,417; 7 pages.
International Search Report and Written Opinion dated Oct. 28, 2014 for Int'l PCT Application PCT/US2014/044991; 12 pages.
PCT International Preliminary Report and Written Opinion dated Jan. 28, 2016 for International Application No. PCT/US2014/044991; 9 Pages.
Office Action dated Nov. 3, 2016 regarding U.S. Appl. No. 14/529,606; 11 pages.
Response to Office Action filed on Jan. 25, 2017 for U.S. Appl. No. 14/529,606; 19 pages.
Notice of Allowance dated Mar. 16, 2017 for U.S. Appl. No. 14/529,606; 9 pages.
Preliminary Amendment filed on Apr. 21, 2017 for U.S. Appl. No. 14/529,606; 12 pages.
Request for Continued Examination filed on Apr. 21, 2017 for U.S. Appl. No. 14/529,606; 3 pages.
Non-final Office Action dated May 19, 2017 for U.S. Appl. No. 14/529,606; 11 pages.
Response to Office Action filed on Jul. 5, 2017 for U.S. Appl. No. 14/529,606; 13 pages.
Notice of Allowance dated Aug. 4, 2017 for U.S. Appl. No. 14/529,606; 9 pages.
Instruction Letter to Yuasa & Hara dated Jul. 30, 2018 instructions to file Voluntary Amendment for Japanese Application No. 2017-522906; 2 Pages.
English translations of Claims on File dated Sep. 20, 2018 for Japanese Application No. 2017-522906; 7 Pages.
Letter from Foreign Associate dated Sep. 20, 2018 reporting voluntary amendment filed for Japanese Application No. 2017-522906; 2 Pages.
Notice of Reason for rejection with English translation dated Oct. 23, 2019 for Japanese Application No. 2017-522906; 5 pages.
Response to Notice of Reason for rejection with English translation dated Dec. 26, 2019 for Japanese Application No. 2017-522906; 16 pages.
Allowed Specification dated Jul. 7, 2016 for EP Pat. Appl. No. 15853626.8; 104 pages.
A.A. Thornton letter dated Nov. 26, 2018 in response to Official Communication dated Jul. 9, 2018 for EP Pat. Appl. No. 15853626.8; 4 pages.
Amended Claims filed on Nov. 26, 2018 for EP Pat. Appl. No. 15853626.8; 4 pages.
Intention to Grant dated Apr. 25, 2019 for EP Pat. Appl. No. 15853626.8-1022; 7 pages.
Communication under Rule 71(3) EPC dated Oct. 10, 2018 for International Application No. 15791066.2; 7 Pages.
Allowed Specification dated May 6, 2016 for International Application No. 15791066.2; 102 Pages.
Notice of Allowance with English Allowed claims dated Jun. 10, 2019 for Japanese Patent Application No. 2017-522908 with English Translation of Allowed Claims; 12 Pages.
Office Action dated Jul. 14, 2016 for Pat. U.S. Appl. No. 14/529,594; 94 pages.
Response to Office Action filed Oct. 14, 2016 for U.S. Appl. No. 14/529,594; 29 pages.
Final Office Action dated Jan. 4, 2017 for U.S. Appl. No. 14/529,594; 38 pages.
Response to Final Office Action filed on Mar. 31, 2017 for U.S. Appl. No. 14/529,594, 16 pages.
Notice of Allowance dated May 10, 2017 for U.S. Appl. No. 14/529,594; 8 pages.
Preliminary Amendment filed on Jun. 16, 2017 for U.S. Appl. No. 15/624,898; 15 pages.
Office Action dated Nov. 28, 2018 for U.S. Appl. No. 15/624,898; 35 Pages.
Response to Office Action dated Nov. 28, 2018 and filed on Jan. 11, 2019 for U.S. Appl. No. 15/624,898; 17 pages.
Final Office Action dated Feb. 14, 2019 for U.S. Appl. No. 15/624,898; 30 pages.
Amendment under 37 C.F.R. §1.114 filed on Apr. 10, 2019 for U.S. Appl. No. 15/624,898; 19 pages.
Office Action dated Sep. 26, 2019 for U.S. Appl. No. 15/624,898; 10 pages.
Response to Office Action dated Nov. 7, 2019 for U.S. Appl. No. 15/624,898; 14 pages.
Final Office Action dated Jan. 17, 2020 for U.S. Appl. No. 15/624,898; 13 pages.
Response to Final Office Action dated Apr. 9, 2020 for U.S. Appl. No. 15/624,898; 15 pages.
Notice of Allowance dated Apr. 22, 2020 for U.S. Appl. No. 15/624,898; 8 pages.
Extended European Search Report dated Apr. 3, 2020 for European Application No. 19198294.1; 20 pages.
Response to Office Action filed on May 11, 2020 for U.S. Appl. No. 15/658,757; 15 pages.
Extended European Search Report dated May 4, 2020 for European Application No. 19209914.1; 9 pages.
Notice of Allowance dated May 28, 2020 for U.S. Appl. No. 15/658,757; 8 pages.
Response to Office Action and Request for Examination (RCE) dated Jun. 2, 2020 for U.S. Appl. No. 16/136,844; 13 pages.
Notice of Allowance dated Jun. 23, 2020 for U.S. Appl. No. 16/136,844; 12 pages.
Office Action dated Jun. 8, 2020 for U.S. Appl. No. 16/232,348; 10 pages.
U.S. Appl. No. 16/899,702, filed Jun. 12, 2020, David et al.
Office Action dated Mar. 19, 2021 for U.S. Appl. No. 16/683,803; 11 pages.
European Examination Report dated Apr. 22, 2021 for European Application No. 19198294.1; 9 pages.
U.S. Appl. No. 16/232,348, filed Jan. 11, 2019, Eagen et al.
U.S. Appl. No. 16/683,803, filed Nov. 14, 2019, Diaconu et al.
Notice of Allowance dated Sep. 16, 2020 for U.S. Appl. No. 16/232,348; 6 pages.
Response to European Communication filed on Nov. 6, 2020 for European Application No. 19198294.1; 16 pages.
Response to Office Action filed on Aug. 25, 2020 for U.S. Appl. No. 16/232,348; 16 pages.
Response to European Communication filed on Jan. 6, 2021 for European Application No. 19209914.1; 28 pages.
Notice of Allowance dated Aug. 20, 2021 for U.S. Appl. No. 16/683,803; 8 pages.

\* cited by examiner

MAGNETIC FIELD SENSOR HAVING TWO ROWS OF MAGNETIC FIELD SENSING ELEMENTS FOR MEASURING AN ANGLE OF ROTATION OF A MAGNET

CROSS REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to magnetic field sensors, and, more particularly, to a magnetic field sensor that uses two rows of magnetic field sensing elements for measuring and angle of rotation of a magnet.

BACKGROUND

As is known, there are a variety of types of magnetic field sensing elements, including, but not limited to, Hall Effect elements, magnetoresistance elements, and magnetotransistors. As is also known, there are different types of Hall Effect elements, for example, planar Hall elements, vertical Hall elements, and circular vertical Hall elements (CVH). As is also known, there are different types of magnetoresistance elements, for example, anisotropic magnetoresistance (AMR) elements, giant magnetoresistance (GMR) elements, tunneling magnetoresistance (TMR) elements, Indium antimonide (InSb) elements, and magnetic tunnel junction (MTJ) elements.

Hall Effect elements generate an output voltage proportional to a magnetic field. In contrast, magnetoresistance elements change resistance in proportion to a magnetic field. In a circuit, an electrical current can be directed through the magnetoresistance element, thereby generating a voltage output signal proportional to the magnetic field.

Magnetic field sensors, which use magnetic field sensing elements, are used in a variety of applications, including, but not limited to, a current sensor that senses a magnetic field generated by a current carried by a current-carrying conductor, a magnetic switch (also referred to herein as a proximity detector) that senses the proximity of a ferromagnetic or magnetic object, a rotation detector that senses passing ferromagnetic articles, for example, gear teeth, and a magnetic field sensor that senses a magnetic field density of a magnetic field.

Circular Vertical Hall (CVH) elements can generate an output signal related to an angle of rotation of a magnet. However, CVH elements tend to be complex and generate errors in a sensed angle even when there is no misalignment between the CVH sensing element and the magnet. CVH elements can also suffer from errors due to misalignment between the CVH element and a sensed magnet.

Generally, magnetic field sensors used to detect or measure a rotation angle of a magnet can suffer from errors due to misalignment between the magnetic field sensor and the magnet. It would be desirable to provide a magnetic field sensor used to detect a rotation angle of a magnet, which has a relatively simple structure, and for which misalignments between the magnetic field sensor, or, more particularly, for which misalignments between magnetic field sensing elements within the magnetic field sensor and the magnet have reduced errors in a signal indicative of a sensed angle.

SUMMARY

The present invention provides a magnetic field sensor used to detect a rotation angle of a magnet, which has a relatively simple structure, and for which misalignments between the magnetic field sensor, or, more particularly, for which misalignments between magnetic field sensing elements within the magnetic field sensor and the magnet have reduced errors in a signal indicative of a sensed angle.

In accordance with an example useful for understanding an aspect of the present invention, a magnetic field sensor for sensing an absolute position of a magnet capable of turning around a rotation axis, the magnet having a magnetic region with a boundary line between and separating a north and a south pole and with a north-south line passing through the north pole and the south pole, can include: a first row of magnetic field sensing elements comprised of a first three or more magnetic field sensing elements disposed proximate to the magnet and arranged along a selected one of a first straight line disposed in an x-y plane or a first arc disposed in the x-y plane, the x-y plane substantially perpendicular to the rotation axis, the first three or more magnetic field sensing elements operable to generate a first three or more signals. The magnetic field sensor can also include a second row of magnetic field sensing elements comprised of a second three or more magnetic field sensing elements disposed proximate to the magnet and arranged along a selected one of a second straight line parallel to the first straight line disposed in the x-y plane or a second arc disposed in the x-y plane, the second three of more magnetic field sensing elements operable to generate a second three or more signals, wherein the first row of magnetic field sensing elements and the second row of magnetic field sensing elements are disposed on opposite sides of the rotation axis. The magnetic field sensor can also include a first electronic channel coupled to the first three or more signals and operable to generate a first one or more values indicative of an angle of the north-south line relative to the first row of magnetic field sensing elements. The magnetic field sensor can also include a second electronic channel coupled to the second three or more signals and operable to generate a second one or more values indicative of an angle of the north-south line relative to the second row of magnetic field sensing elements. The magnetic field sensor can also include a combining module operable to combine the first one or more values and the second one or more values to generate a relative angle value, wherein the relative angle value is indicative of a rotation angle of the magnet about the rotation axis relative to a position of the first and second rows of magnetic field sensing elements.

BRIEF DESCRIPTION OF THE DRAWINGS

The foregoing features of the invention, as well as the invention itself may be more fully understood from the following detailed description of the drawings, in which.

DETAILED DESCRIPTION

Figure 1:
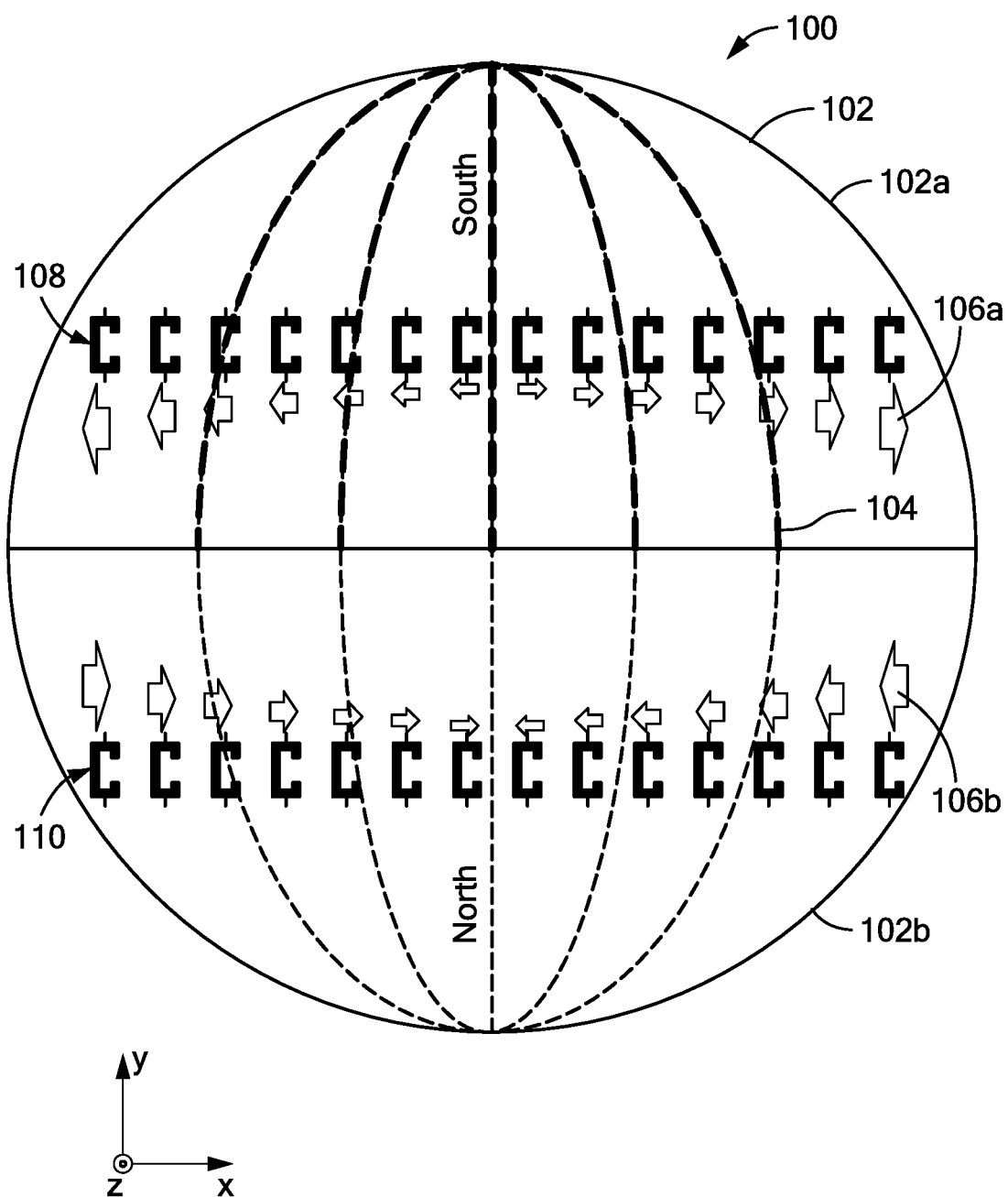
FIG. 1 is a pictorial showing two rows of magnetoresistance elements, e.g., GMR elements, in relation to a two pole circular magnet, and also showing illustrative magnetic field lines associated with the magnet.

Before describing the present invention, it should be noted that reference is sometimes made herein to magnets having a particular shape (e.g., round). One of ordinary skill in the art will appreciate, however, that the techniques described herein are applicable to a variety of sizes and shapes of magnets.

Before describing the present invention, some introductory concepts and terminology are explained.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe an assembly that uses one or more magnetic field sensing elements in combination with an electronic circuit, all disposed upon a common substrate, e.g., a semiconductor substrate. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

As used herein, the term "magnetic field signal" is used to describe any circuit signal that results from a magnetic field experienced by a magnetic field sensing element.

Particular magnetic field sensors having GMR elements are used as examples herein. However, the circuits and techniques described herein can apply other types of magnetoresistance elements, e.g., TMR, or AMR elements. Vertical Hall elements can also be used, but with modifications to circuits shown and described herein.

The terms "parallel" and "perpendicular" are used in various contexts herein. It should be understood that the terms parallel and perpendicular do not require exact perpendicularity or exact parallelism, but instead it is intended that normal manufacturing tolerances apply, which tolerances depend upon the context in which the terms are used. In some instances, the term "substantially" is used to modify the terms "parallel" or "perpendicular." In general, use of the term "substantially" reflects angles that are beyond manufacturing tolerances, for example, within +/−ten degrees.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be analog or digital.

As used herein, the term "module" can be used to describe a "processor." However, the term "module" is used more generally to describe any circuit that can transform an input signal into an output signal that is different than the input signal.

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks (e.g. processors or modules), it will be understood that the analog blocks can be replaced by digital blocks (e.g. processors or modules) that perform the same or similar functions and the digital blocks can be replaced by analog blocks that perform the same or similar functions. Analog-to-digital or digital-to-analog conversions may not be explicitly shown in the figures, but should be understood.

In particular, it should be understood that a so-called comparator can be comprised of an analog comparator having a two state output signal indicative of an input signal being above or below a threshold level (or indicative of one input signal being above or below another input signal). However, the comparator can also be comprised of a digital circuit having an output signal with at least two states indicative of an input signal being above or below a threshold level (or indicative of one input signal being above or below another input signal), respectively, or a digital value above or below a digital threshold value (or another digital value), respectively.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

As used herein, the term "amplifier" is used to describe a circuit element with a gain greater than one, less than one, or equal to one.

As used herein, the terms "line" and "linear" are used to describe either a straight line or a curved line. The line can be described by a function having any order less than infinite.

Flat circular (i.e., disk shaped) magnets are described below. However, it should be understood that rotation angles of magnets having other shapes can be detected with the same or similar circuits and techniques described below.

Referring to FIG. 1, a magnetic arrangement 100 can include a circular magnet 102 having north and south regions 102b, 102a, respectively, with north and south poles, a line between which (e.g., magnetized along a line) can be substantially parallel to a y-axis. The circular magnet 102 can have a circular shape in an x-y plane and can have two opposing flat surfaces in two planes parallel to the x-y plane, both displaced in the z direction. Thus, the circular magnet 102 can be disk shaped.

Giant magnetoresistance (GMR) elements are shown as an example. First and second rows 108, 110 of magnetoresistance elements can be arranged in substantially straight lines substantially parallel to an x-axis. Each one of the magnetoresistance elements can have a respective axis of maximum sensitivity substantially parallel to the x-axis.

Isolines of magnetic field amplitude, e.g., 104, can pass through magnetoresistance elements of the first and second rows 108, 110 of magnetoresistance elements. Only some of the isolines are shown for clarity.

Direction components of magnetic fields experienced by magnetoresistance elements of the first and second rows 108, 110 of magnetoresistance elements in the x-direction are illustrated by arrows, e.g., arrows 106a, 106b. Sizes of the arrows, e.g., 106a, 106b, are representative of respective x-direction magnetic field amplitudes proximate to magnetoresistance elements of the first and second rows 108, 110 of magnetoresistance elements. Pointing directions of the arrows, e.g., 106a, 106b, are representative of respective x-direction magnetic field directions proximate to magnetoresistance elements of the first and second rows 108, 110 of magnetoresistance elements.

Figure 2:
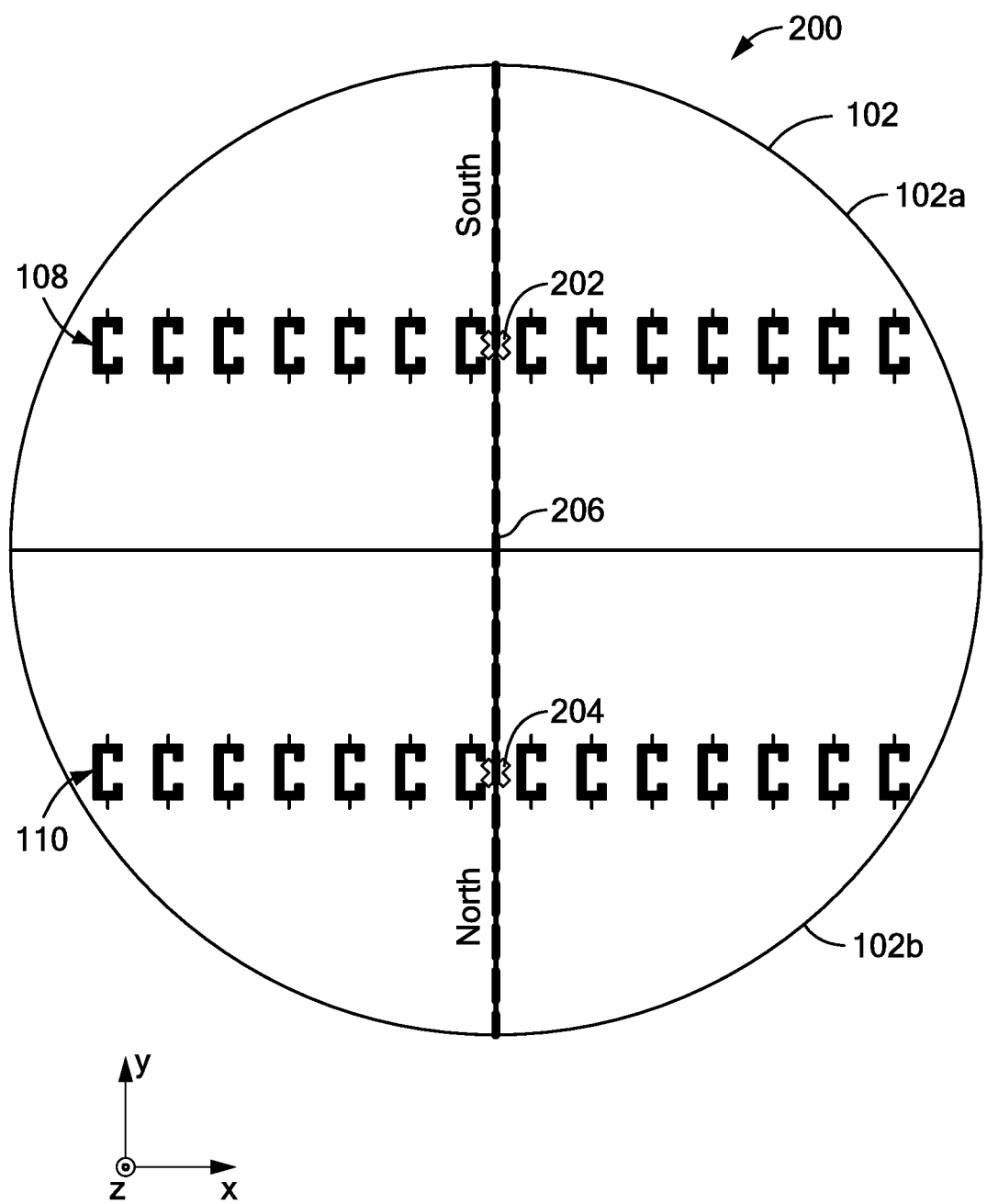
FIG. 2 is a pictorial showing two rows of magnetoresistance elements, e.g., GMR elements, in relation to a two pole circular magnet for which north and south poles have a particular alignment with respect to the two rows of magnetoresistance elements, and also showing an axis and two points on the axis indicative of a transition of state values of output signals of the two rows of magnetoresistance elements.

Referring now to FIG. 2, in which like elements of FIG. 1 are shown having like reference designation, a line 206 is indicative of a line passing through north and south poles of the magnet 102.

Point 202 passing through the line 206 is indicative, referring briefly to FIG. 1, of a point in space at which the magnetic field experience by magnetoresistance elements with the first row of magnetoresistance elements 108 changes in direction. Thus, if output signals from the magnetoresistance elements of the first row of magnetoresistance elements 108 were compared with respective threshold values, having the same value, then the comparisons for magnetoresistance elements to the left of the point 202 would result in a first state and the comparisons for magnetoresistance elements to the right of the point 202 would result in a second state different than the first state. Illustrative comparators are shown below in FIG. 8.

Comparisons associated with the second row 110 of magnetoresistance elements would result in similar states. However, referring again briefly to FIG. 1, because x-direction components of the magnetic fields proximate to magnetoresistance elements of the second row 110 of magnetoresistance elements represented by arrows, e.g., 106b, are opposite to similar arrows, e.g., 106a, associated with the first row 108 of magnetoresistance elements, the state described above would be opposite for the second row 110 of magnetoresistance elements. Namely, comparisons for magnetoresistance elements to the left of the point 204 would result in the second state and the comparisons for magnetoresistance elements to the right of the point 202 would result in a first state.

In operation, the magnet 102 or the first and second rows 108, 110 can rotate about an axis substantially parallel to a z axis. With the position of element represented in magnetic arrangement 100, the rotation angle can be identified by which ones of the magnetoresistance elements of the first and second rows 108, 110 of magnetoresistance elements upon comparison with respective but same thresholds, result in high states and which result in low states. Other rotations are shown and described below.

The first and second rows 108, 110 can be used in a differencing arrangement. That is, if the first point 202 at which states of the magnetoresistance elements of the first row 108 of magnetoresistance element change state is at a magnetoresistance element 7.5 (i.e., between elements 7 and 8), and the second point 204 at which states of the magnetoresistance elements of the second row 110 of magnetoresistance element change state is at a magnetoresistance element 7.5, then a difference, 7.5−7.5=0, can indicate the rotation of the magnet 102 or of the first and second rows 108, 110 of magnetoresistance elements of the magnetic arrangement 200.

From discuss below, it will become apparent that taking the difference can result in smaller errors due to misalignment of the magnet 102 with the first and second rows 108, 110 of magnetoresistance elements. However, it is also possible to use only one of the first or second rows 108, 110 of magnetoresistance elements, in which case there is no difference, and the 7.5 element position can be indicative of the angle.

Figure 3:
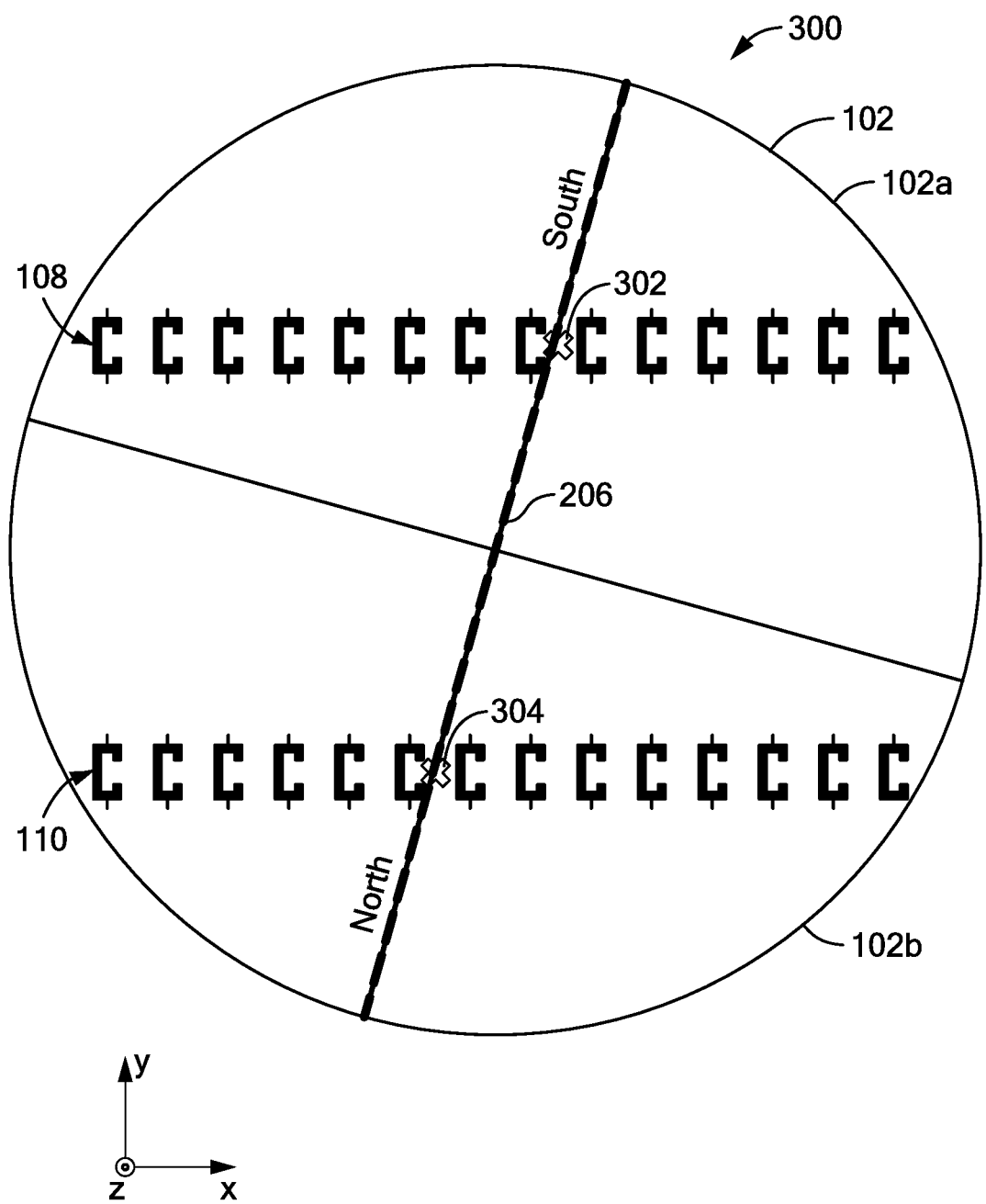
FIG. 3 is a pictorial showing two rows of magnetoresistance elements, e.g., GMR elements, in relation to a two pole circular magnet for which north and south poles have a different particular alignment with respect to the two rows of magnetoresistance elements, and also showing an axis and two points on the axis indicative of a transition of state values of output signals of the two rows of magnetoresistance elements.

Referring now to FIG. 3, in which like elements of FIGS. 1 and 2 are shown having like reference designations, a magnetic arrangement 300 is like the magnetic arrangement 200 of FIG. 2, except that a relative rotation between the magnet 102 and the first and second rows 108, 110 of magnetoresistance elements has changed.

Points 302, 304 are like points 202, 204 of FIG. 2 and can have a similar interpretation with regard to states.

The first and second rows 108, 110 can be used in a differencing arrangement. That is, if the first point 302 at which states of the magnetoresistance elements of the first row 108 of magnetoresistance element change state is at a magnetoresistance element 8.5 (i.e., between elements 8 and 9), and the second point 304 at which states of the magnetoresistance elements of the second row 110 of magnetoresistance element change state is at a magnetoresistance element 6.5, then a difference, 8.5−6.5=2, can indicate the rotation of the magnet 102 or of the first and second rows 108, 110 of magnetoresistance elements of the magnetic arrangement 300.

It is also possible to use only one of the first or second rows 108, 110 of magnetoresistance elements, in which case there is no difference and either the 8.5 element position or the 6.5 element position can be indicative of the angle.

Figure 4:
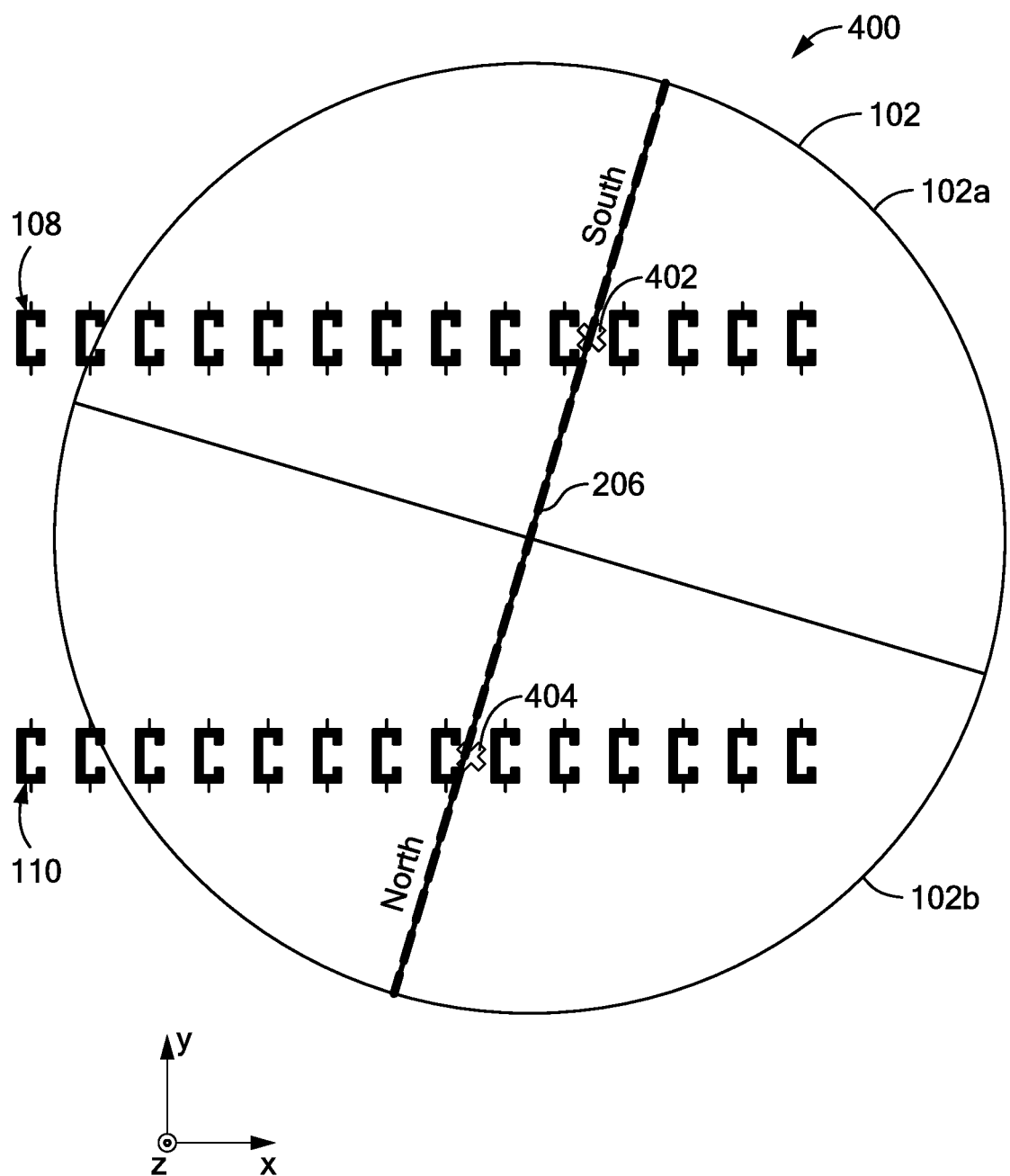
FIG. 4 is a pictorial showing two rows of magnetoresistance elements, e.g., GMR elements, in relation to a two pole circular magnet for which north and south poles have a different particular alignment with respect to the two rows of magnetoresistance elements, wherein there is a misalignment between the magnet and the two rows of magnetoresistance elements, and also showing an axis and two points on the axis indicative of a transition of state values of output signals of the two rows of magnetoresistance elements.

Referring now to FIG. 4, in which like elements of FIGS. 1, 2, and 3 are shown having like reference designations, a magnetic arrangement 400 is like the magnetic arrangement of FIG. 3 and has the same relative rotation of elements. However, there is an undesirable misalignment in the x-direction between a center of the magnet 102 and the first and second rows 108, 110 of magnetoresistance elements, except that a relative rotation between the magnet 102 and the first and second rows 108, 110 of magnetoresistance elements has changed.

Points 402, 404 are like points 202, 204 of FIG. 2 and can have a similar interpretation with regard to states.

The first and second rows 108, 110 can be used in a differencing arrangement. That is, if the first point 402 at which states of the magnetoresistance elements of the first row 108 of magnetoresistance element change state is at a magnetoresistance element 10.5 (i.e., between elements 10 and 11), and the second point 304 at which states of the magnetoresistance elements of the second row 110 of magnetoresistance element change state is at a magnetoresistance element 8.5, then a difference, 10.5−8−5=2, can indicate the rotation of the magnet 102 or of the first and second rows 108, 110 of magnetoresistance elements of the magnetic arrangement 400.

It should be apparent that, using the differencing arrangement, the first magnetic arrangement 300 with no misalignment and the second magnetic arrangement 400 with misalignment, can both result in the same difference value indicative of the same rotation.

Figure 5:
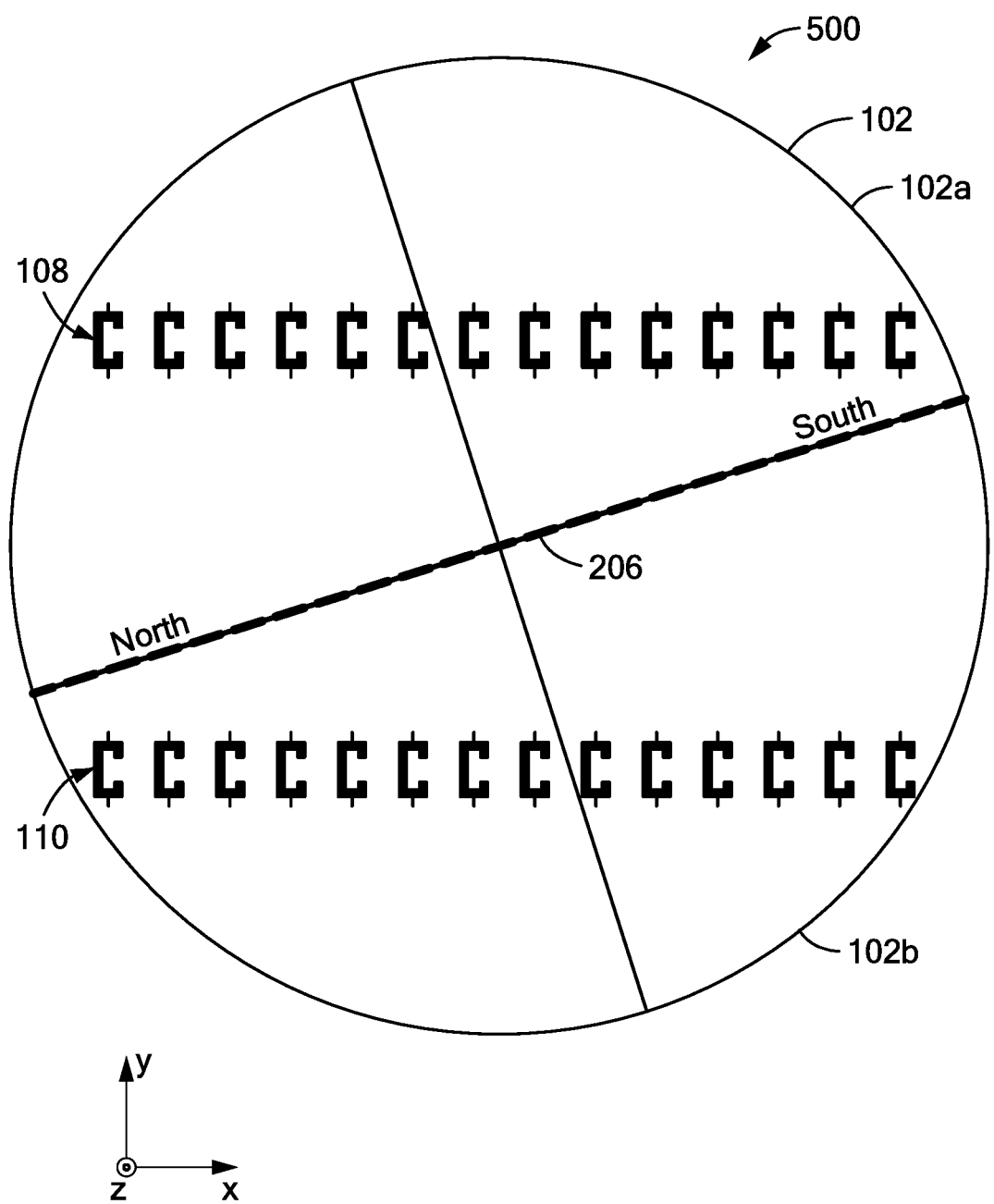
FIG. 5 is a pictorial showing two rows of magnetoresistance elements, e.g., GMR elements, in relation to a two pole circular magnet for which north and south poles have a different particular alignment with respect to the two rows of magnetoresistance elements, and also showing an axis and no points on the axis that would otherwise be indicative of a transition of state values of output signals of the two rows of magnetoresistance elements.

Referring now to FIG. 5, in which like elements of FIGS. 1-4 are shown having like reference designations, a magnetic arrangement 500 is like the magnetic arrangement 300 of FIG. 3, except that a relative rotation between the magnet 102 and the first and second rows 108, 110 of magnetoresistance elements has changed, such that the line 206 between north an south poles of the magnet 102 no longer intersects the first or second rows 108, 110 of magnetoresistance elements. At this rotation, all of the magnetoresistance elements of the first row 108 of magnetoresistance elements, if compared to respective same thresholds, would result in the above-described first state, and all of the magnetoresistance elements of the second row 110 of magnetoresistance elements, if compared to respective same thresholds, would result in the above-described second state. In the magnetic arrangement 500 it is not possible to detect rotations of the magnet 102 or of the first and second rows 108, 110 of magnetoresistance elements.

It should be apparent that the techniques described in FIGS. 1-4 and 6 can detect rotation of the magnet 102 or of the first and second rows 108, 110 of magnetoresistance elements through a restricted range of rotations less than +/−one hundred twenty degrees, depending upon geometric factors. In some embodiments, the restriction allows detection of rotation for a restricted range of +/−one hundred ten degrees, +/−one hundred degrees, +/−ninety degrees, +/−eighty degrees, +/−seventy degrees, +/−sixty degree, +/−fifty degrees, +/−forty-five degrees, +/−forty degrees, +/−thirty degrees, +/−twenty degrees, or +/−ten degrees.

Figure 6:
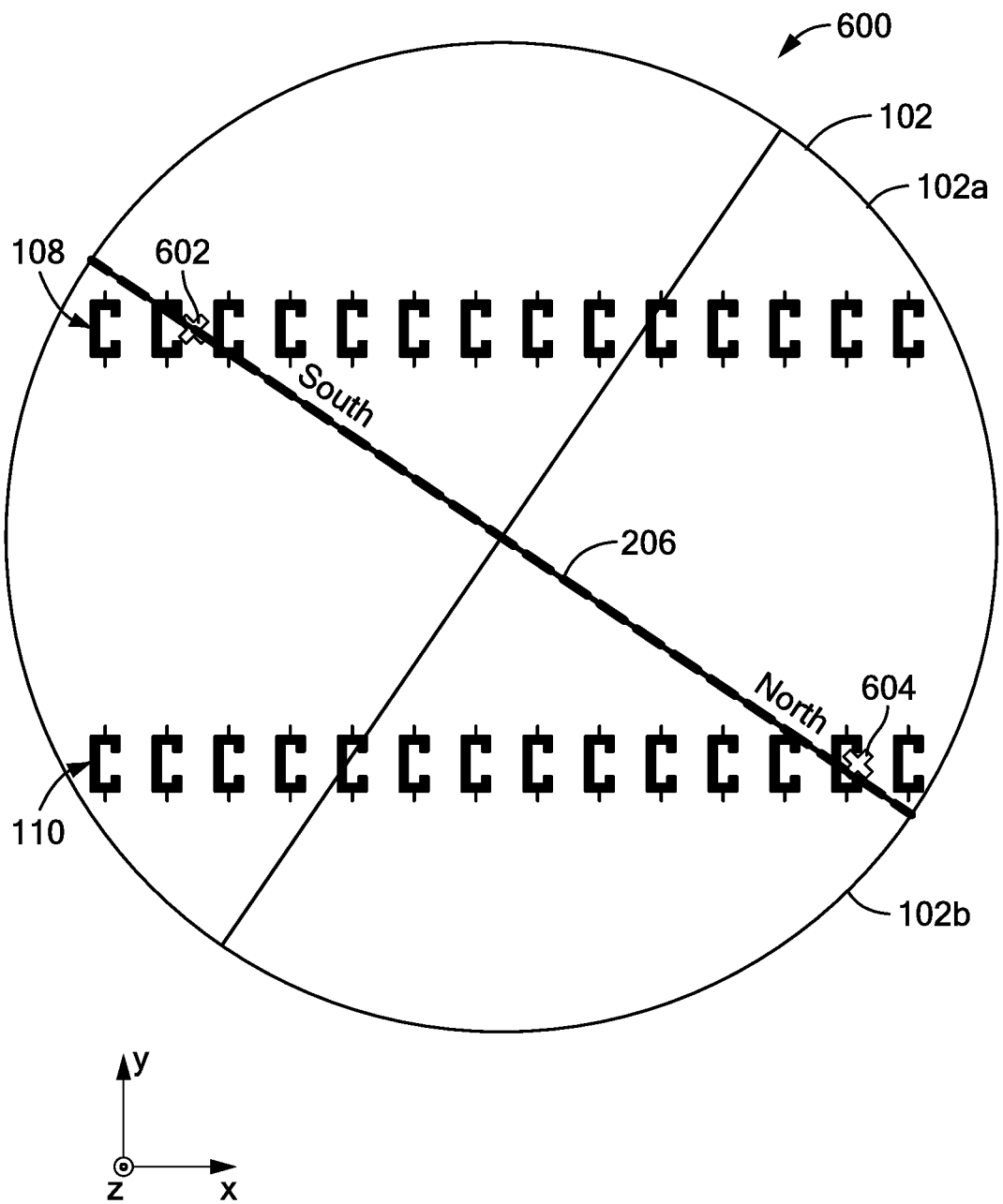
FIG. 6 is a pictorial showing two rows of magnetoresistance elements, e.g., GMR elements, in relation to a two pole circular magnet for which north and south poles have yet another different particular alignment with respect to the two rows of magnetoresistance elements, and also showing an axis and two points on the axis indicative of a transition of state values of output signals of the two rows of magnetoresistance elements.

Referring now to FIG. 6, in which like elements of FIGS. 1-4 are shown having like reference designations, a magnetic arrangement 600 is like the magnetic arrangement 300 of FIG. 3, except that a relative rotation between the magnet 102 and the first and second rows 108, 110 of magnetoresistance elements has changed to an opposite relative rotation.

Points 602, 604 are like points 202, 204 of FIG. 2 and can have a similar interpretation with regard to states.

The first and second rows 108, 110 can be used in a differencing arrangement. That is, if the first point 602 at which states of the magnetoresistance elements of the first row 108 of magnetoresistance element change state is at a magnetoresistance element 2.5 (i.e., between elements 2 and 3), and the second point 604 at which states of the magnetoresistance elements of the second row 110 of magnetoresistance element change state is at a magnetoresistance element 13.5, then a difference, 2.5−13.5=−11, can indicate the rotation of the magnet 102 or of the first and second rows 108, 110 of magnetoresistance elements of the magnetic arrangement 600.

While differencing arrangements are described above, integration techniques described below in conjunction with FIG. 9 can be used in place of the differencing arrangements in order to achieve a similar result.

Figure 7:
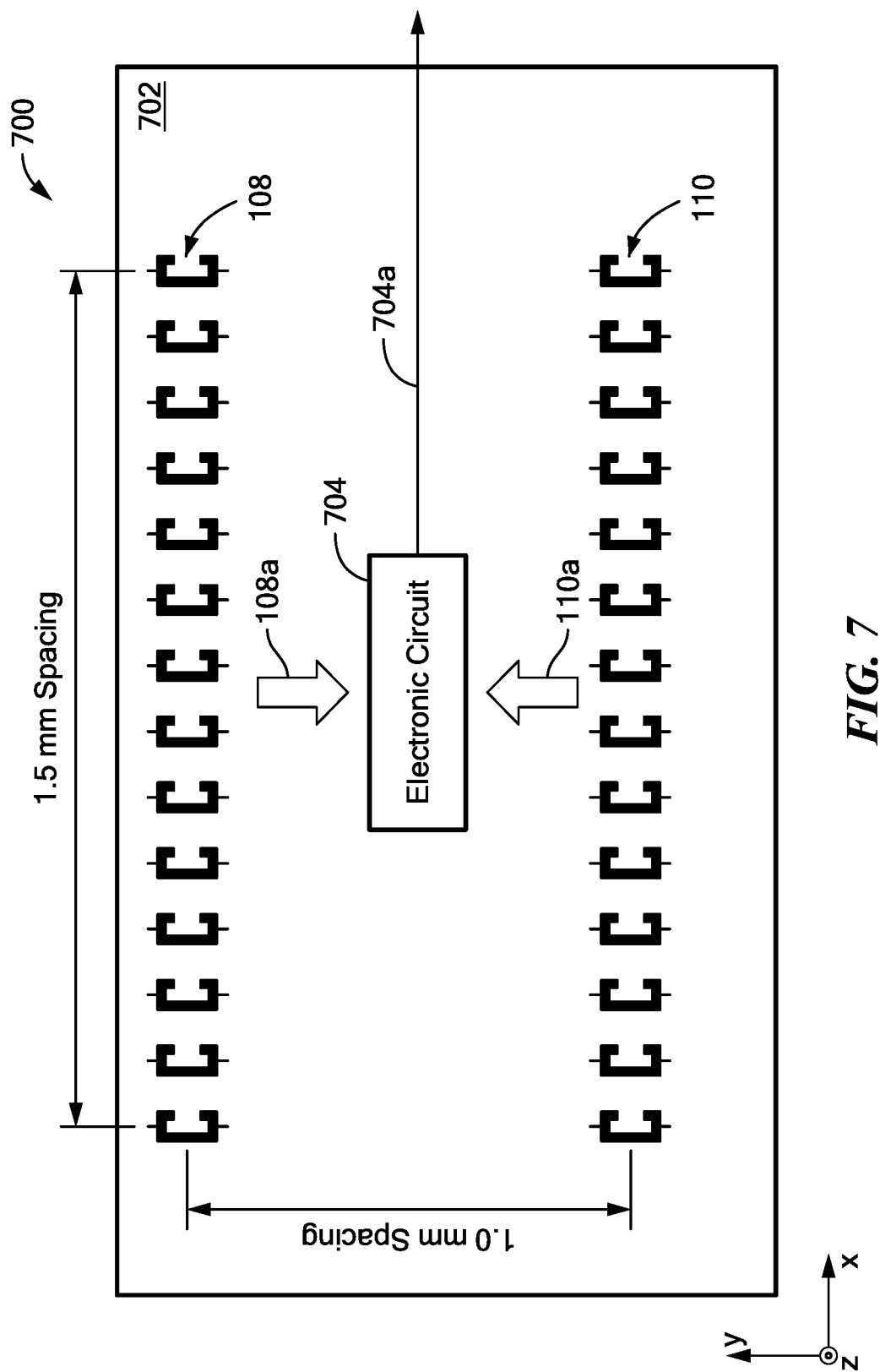
FIG. 7 is a block diagram of a magnetic field sensor having two rows of magnetoresistance elements, e.g., GMR elements, and an electronic circuit, all disposed upon a substrate.

Referring now to FIG. 7, a magnetic field sensor 700 can include the first and second rows 108, 110 of magnetoresistance elements shown here with illustrative spacing and with illustrative numbers of magnetoresistance elements, here fifteen magnetoresistance elements in each one of the first or second rows 108, 110 of magnetoresistance elements. Other spacings and/or quantities of magnetoresistance elements are also possible.

The first and second rows 108, 110 of magnetoresistance elements can be disposed upon a substrate 702, e.g., a semiconductor substrate, e.g., a silicon substrate.

An electronic circuit 704 can be disposed upon the substrate 704 and can be coupled to receive signals 108a, 110a from the first and second rows 108, 110 of magnetoresistance elements.

The magnetic field sensor 700 can be disposed over or under the magnet 102 of FIGS. above.

The electronic circuit 704 can be configured to generate a signal 704a indicative of a relative angle between a magnet, e.g., the magnet 102, and the first and second rows 108, 110 of magnetoresistance elements.

Figure 8:
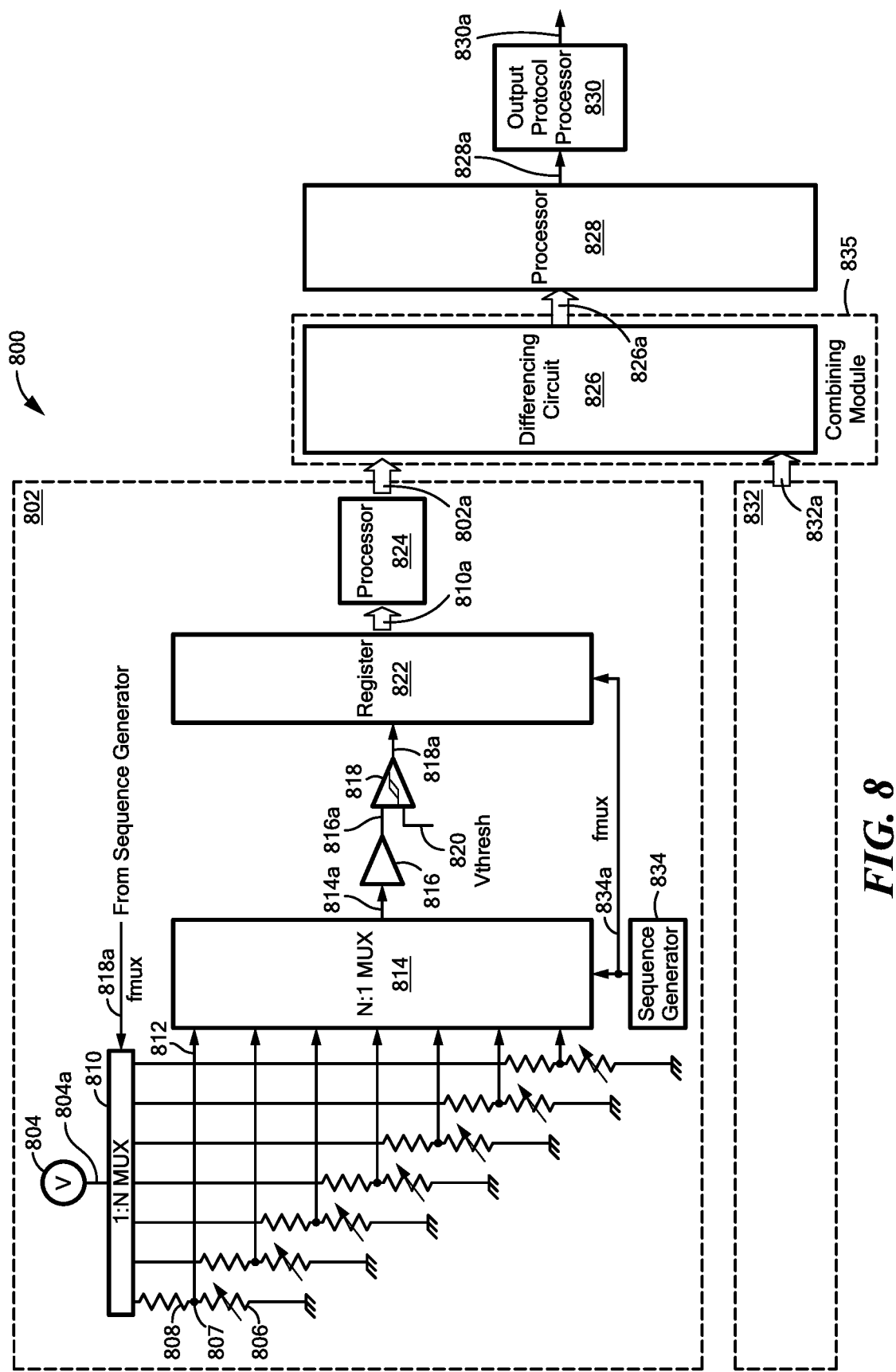
FIG. 8 is a block diagram of a magnetic field sensor having two rows of magnetoresistance elements, e.g., GMR elements, and an electronic circuit, which can be the same as the two rows of magnetoresistance elements and the electronic circuit of FIG. 7.

Referring now to FIG. 8, a magnetic field sensor 800 can include a first portion 802 for processing a first plurality of magnetoresistance elements, e.g., 806, that can be representative of the first row of magnetoresistance elements 108 of the above figures. Remaining elements of the magnetic field sensor 800 can be representative of the electronic circuit 704 of FIG. 7.

The first plurality of magnetoresistance elements, e.g., 806, can be coupled to a respective plurality of resistors, e.g. 808, at a respective plurality of junction nodes, e.g., 807. Each resistor, e.g., 808, can be coupled through a 1:N multiplexer 810 to a power supply 804 operable to generate a power supply voltage 804a.

The 1:N multiplexer 810 can be operable to provide the power supply voltage 804a to ones of the resistors, e.g., 808, one at a time or in any combination, in a periodic sequence in accordance with a sequence control signal 834a generated by a sequence generator 834. The junction nodes, e.g., 807 can be operable to generate a resulting plurality of voltage signals, e.g., 812, in the periodic sequence.

An N:1 multiplexer 814 can be coupled to receive plurality of voltage signals, e.g., 812. The N:1 multiplexer 814 can be operable to generate a time-multiplexed signal 814a indicative of sequential ones of the plurality of voltage signals, e.g., 812. The N:1 multiplexer can provide a sequence of the time-multiplexed signal 814a as determined by the sequence control signal 834a.

An amplifier 816 can be coupled to receive the time-multiplexed signal 814a and can be operable to generate an amplified time-multiplexed signal 816a.

A comparator 818 can be coupled to receive the amplified time-multiplexed signal 816a, coupled to receive a threshold signal 820, and can be operable to generate a time-multiplexed digital signal 818a having a time sequence of two-state values, each two state value indicative of one of the voltage signal, e.g., 812, being above or below a threshold, of which the threshold 820 is representative. In some embodiments, if all of the time-multiplexed two-state values of the digital signal 818a are above or below the threshold 820, the threshold 820 can be inverted to identify magnet polarity, and therefore, which direction of rotation has been exceeded.

A register 822 (memory) can be coupled to receive and store two-state values of the time-multiplexed digital signal 818a in a storage sequence determined by the sequence control signal 834a. The two-state values can be provided to a processor 824 as signal 810a. The processor 824 can arrange two-state values of the signal 810a into a first formatted signal 802a, which can be, for example, a first parallel set of two-state values.

A second portion 832 of the magnetic field sensor 800 can include the same elements as the first portion 802, but can use a second plurality of magnetoresistance elements, which can be representative of the second row of magnetic field sensing elements 110 of figures above.

The second portion 832 can generate a second formatted signal 832a, which can be, for example, a second parallel set of two-state values. The first and second value 802a, 832a can be the same as or signal to the two values described above in conjunction with FIGS. 2-4 and 6.

The first and second formatted values 802a, 832a can be communicated to a differencing circuit 826 is operable to generate a difference value 826a related to difference of the first and second formatted signals 802a, 832a. Differencing is described above in conjunction with FIGS. 2-4 and 6. The difference value 826a is also referred to herein as an angle value, which is representative of a relative angle of the magnet 102 with respect to the first and second rows 108, 110 of magnetoresistance elements.

The difference value 826a can be communicated to a processor 828, which, from a plurality of the difference values 826a, can identify a relative angle of the line 206 of FIGS. 2-4 and 6 (i.e., a relative angle between the circular magnet 102 and the first and second rows 108, 110 of magnetoresistance elements). In some embodiments, the processor 828 can also identify speed of rotation of the circular magnet 102 of figures above, and, in some embodiments, can identify a relative direction of the rotation of the circular magnet 102. The processor 828 can be operable to generate a signal 828a indicative of the angle, in some embodiments, the relative speed of rotation, and, in some embodiments, the relative direction of the movement. An output protocol processor 830 can be coupled to receive the signal 828a and can be operable to generate a formatted signal 830a also representative of the angle, in some embodiments the relative speed of rotation, and, in some embodiments, the relative direction of rotation of the circular magnet. The formatted signal 830a can be in a selected one of a variety of formats, for example PWM (pulse width modulated), I²C, CAN, or SENT.

In some embodiments, one or more of the processors 824, 828, or 830 are not used.

Figure 9:
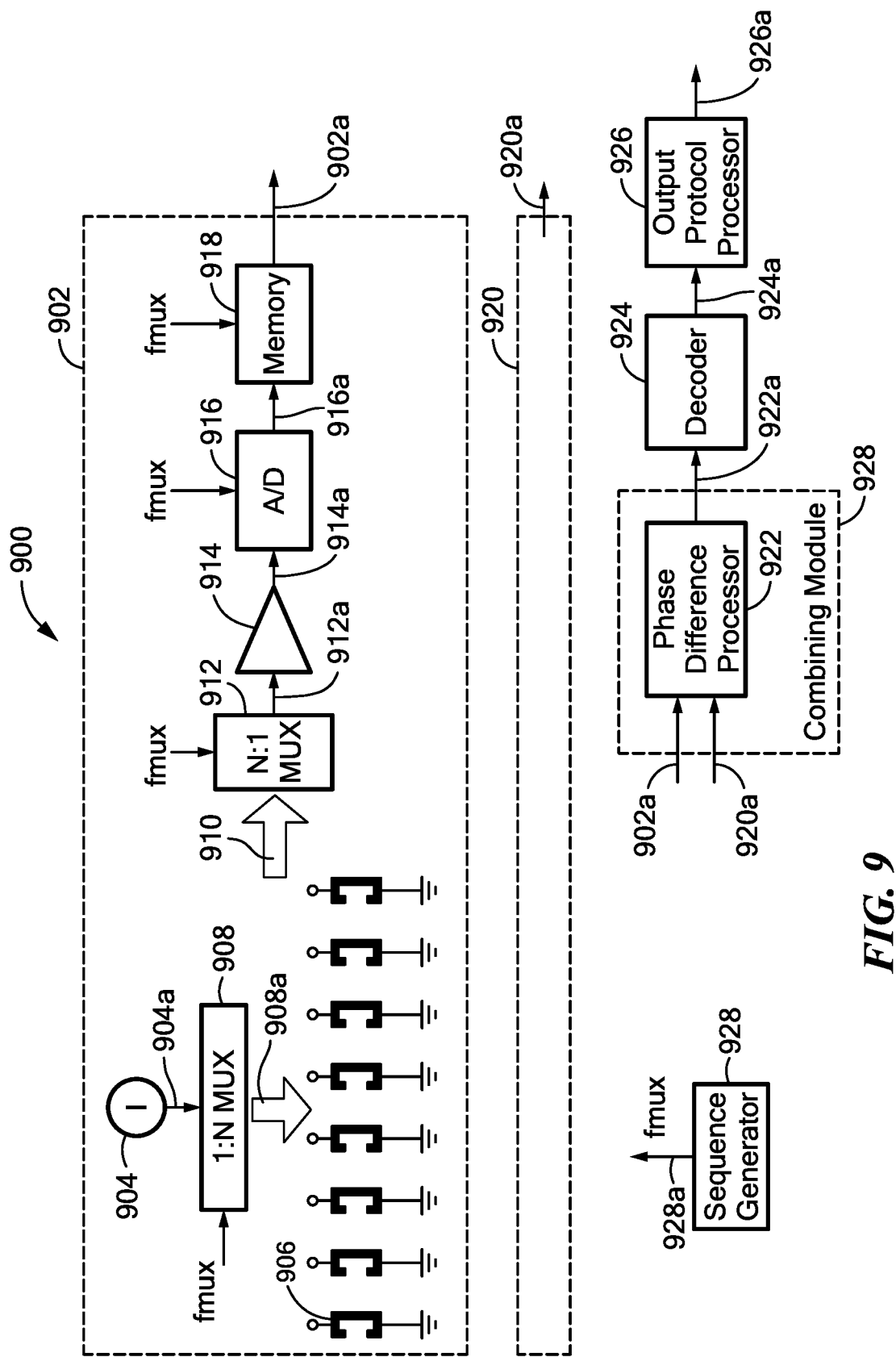
FIG. 9 is a block diagram of a magnetic field sensor having two rows of magnetoresistance elements, e.g., GMR elements, and another electronic circuit, which can be the same as the two rows of magnetoresistance elements and the electronic circuit of FIG. 7.

Referring now to FIG. 9, a magnetic field sensor 900 can include a first portion 902 for processing a first plurality of magnetoresistance elements, e.g., 906, that can be representative of the first row of magnetoresistance elements 108 of the above figures. Remaining elements of the magnetic field sensor 900 can be representative of the electronic circuit 704 of FIG. 7.

The first plurality of magnetoresistance elements, e.g., 906, can be coupled to a reference voltage, e.g., ground. The other ends of each one of the first plurality of magnetoresistance elements, e.g., 906, can be coupled through a 1:N multiplexer 908 to a power supply 904 operable to generate a power supply current 904a.

The 1:N multiplexer 908 can be operable to provide the power supply current 904a, 908a, to ones of the first plurality of magnetoresistance elements, e.g., 906, one at a time or in any combination, in a periodic sequence in accordance with a sequence control signal 928a provided by a sequence generator 928. The first plurality of magnetoresistance elements, e.g., 906, can be operable to generate a resulting plurality of voltage signals, e.g., 910, in the periodic sequence.

An N:1 multiplexer 912 can be coupled to receive the plurality of voltage signals, e.g., 910. The N:1 multiplexer 912 can be operable to generate a time-multiplexed signal 912a indicative of sequential ones of the plurality of voltage signals, e.g., 910. The N:1 multiplexer 912 can provide a sequence of the time-multiplexed signal 912a as determined by the sequence control signal 928a.

An amplifier 914, with or without a filtering function, can be coupled to receive the time-multiplexed signal 912a and can generate and amplified signal 914a, An analog-to-digital converter 916 (A/D) can be coupled to receive the amplified signal 914a and can generate a time-multiplexed digital signal 916a with a sequence determined by the sequence control signal 928a.

The time-multiplexed digital signals 916a can be saved to a memory 918 with a storage sequence determined by the sequence control signal 928a. The memory can store a plurality of values in accordance with the plurality of magnetoresistance elements, e.g., 906.

It should be understood that, unlike the magnetic field sensor 800 of FIG. 8, the magnetic field sensor 900 does not compare signals generated by the plurality of magnetoresistance elements, e.g., 906, with any threshold to generate two-state values. Instead, the plurality of voltage signals, e.g., 910, are amplified, converted to multi-bit digital values 916a and stored in the memory 918.

The memory 918 can be operable to provide a first signal 902a comprised of a first plurality of multi-bit digital values. In accordance with values of the plurality of voltage signals, e.g., 910, the first plurality of multi-bit digital values can be represented, for example, as a first graph for which a horizontal axis has units of magnetoresistance element number of the first plurality of magnetoresistance elements, e.g., 906, here one to eight, and a vertical axis with a scale in units of amplitudes of the first plurality of multi-bit digital values, of which there can be a first eight multi-bit digital values. The first eight multi-bit digital values can have positive values and negative values in accordance with the discussion above in conjunction with FIGS. 1 and 2. Thus, a first line passing through the values of the first eight multi-bit values can have a first zero crossing.

A second portion 920 of the magnetic field sensor 900 can include the same elements as the first portion 902, but can use a second plurality of magnetoresistance elements, which can be representative of the second row of magnetic field sensing elements 110 of figures above.

The second portion 920 can generate a first signal 920a comprised of a second plurality of multi-bit digital values. in accordance with the discussion above, the second plurality of multi-bit digital values can be represented, for example, as a second graph for which a horizontal axis has units of magnetoresistance element number of the second plurality of magnetoresistance elements within the portion 920, here one to eight, and a vertical axis with a scale in units of amplitudes of the second plurality of multi-bit digital signals, of which there can be a second eight multi-bit digital values. Like the first eight multi-bit digital values, the second eight multi-bit digital values can have positive values and negative values in accordance with the discussion above in conjunction with FIGS. 1 and 2. Thus, a second line passing through the values of the second eight multi-bit values can have a second zero crossing that can cross the horizontal axis of the second graph at the same or at a different magnetoresistance element number than the first graphs. The first and second lines can have opposite slopes.

A difference in position of the above-described zero crossings can be indicative of a relative angle between the circular magnet 102 of figures above and the first and second rows of magnetoresistance elements 108, 110, respectively of figures above.

To this end, a phase difference module 922, which, in some embodiments, can be a zero crossing detection processor, can receive the first and second pluralities of multi-bit digital signals 902a, 920a, respectively, and can identify a zero crossing difference as described above, The phase difference module 922 can be operable to generate a phase difference value 922a, which can be a zero crossing difference value. The phase difference value 922a is also referred to herein as an angle value, which is representative of a relative angle of the magnet 102 with respect to the first and second rows 108, 110 of magnetoresistance elements.

At this point, it should be understood that the first and second pluralities of multi-bit digital values 902a, 920b can be generated periodically. For example, a first eight multi-bit digital values within the first plurality of multi-bit digital values 902a and a second eight multi-bit digital values within the second plurality of multi-bit digital values 920a can both be generated at a first time, another eight multi-bit digital values within the first plurality of multi-bit digital values 902a and another eight multi-bit digital values within the second plurality of multi-bit digital values 920a can be generated at a second time, and so on. Thus, the phase difference value 922a can be a plurality of phase difference values A decoder 924 can receive the plurality of phase difference values 922a and can be operable to generate a decoded signal 924a indicative of a relative angle of the line 206 of FIGS. 2-4 and 6 (i.e., a relative angle between the circular magnet 102 and the first and second rows 108, 110 of magnetoresistance elements), in some embodiments, a relative speed of rotation of the circular magnet 102, and, in some embodiments, a relative direction of rotation of the circular magnet 102.

An output protocol processor 926 can be coupled to receive the signal 924a and can be operable to generate a formatted signal 926a also representative of the relative angle, in some embodiments, the relative speed of rotation, and, in some embodiments, the relative direction of rotation of the circular magnet. The formatted signal 926a can be in a selected one of a variety of formats, for example PWM (pulse width modulated), PC, CAN, or SENT.

As described above, particular magnetic field sensors having GMR elements are used as examples above. However, the circuits and techniques described herein, above and below, can apply other types of magnetoresistance elements, e.g., TMR, or AMR elements. Vertical Hall elements can also be used, but with modifications to circuits shown and described above, which modification will be understood.

Figure 10:
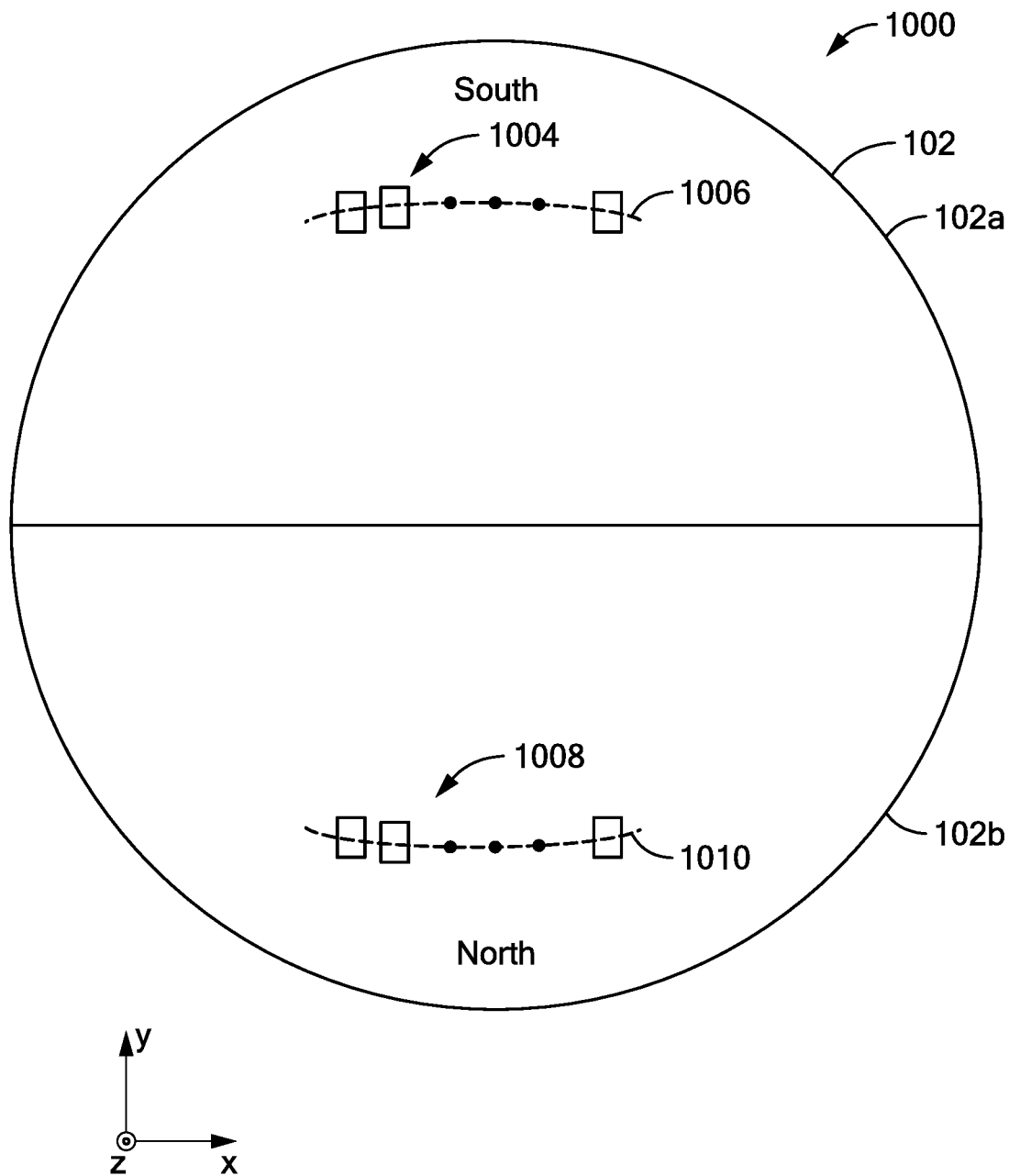
FIG. 10 is a pictorial showing two rows of magnetoresistance elements, e.g., GMR elements, arranged in two arcs, in relation to a two pole circular magnet.

Referring now to FIG. 10, in which like elements of FIG. 2 are shown having like reference designations, in a magnetic arrangement 1000, instead of the straight first and second rows 108, 110 of magnetoresistance elements, a first row 1004 and a second row 1008 of magnetoresistance elements can be arranged on first and second arcs 1006, 1008, i.e., first and second curved lines.

All aspects of FIGS. 1-9 described above also pertain to the magnetic arrangement 1000.

Figure 11:
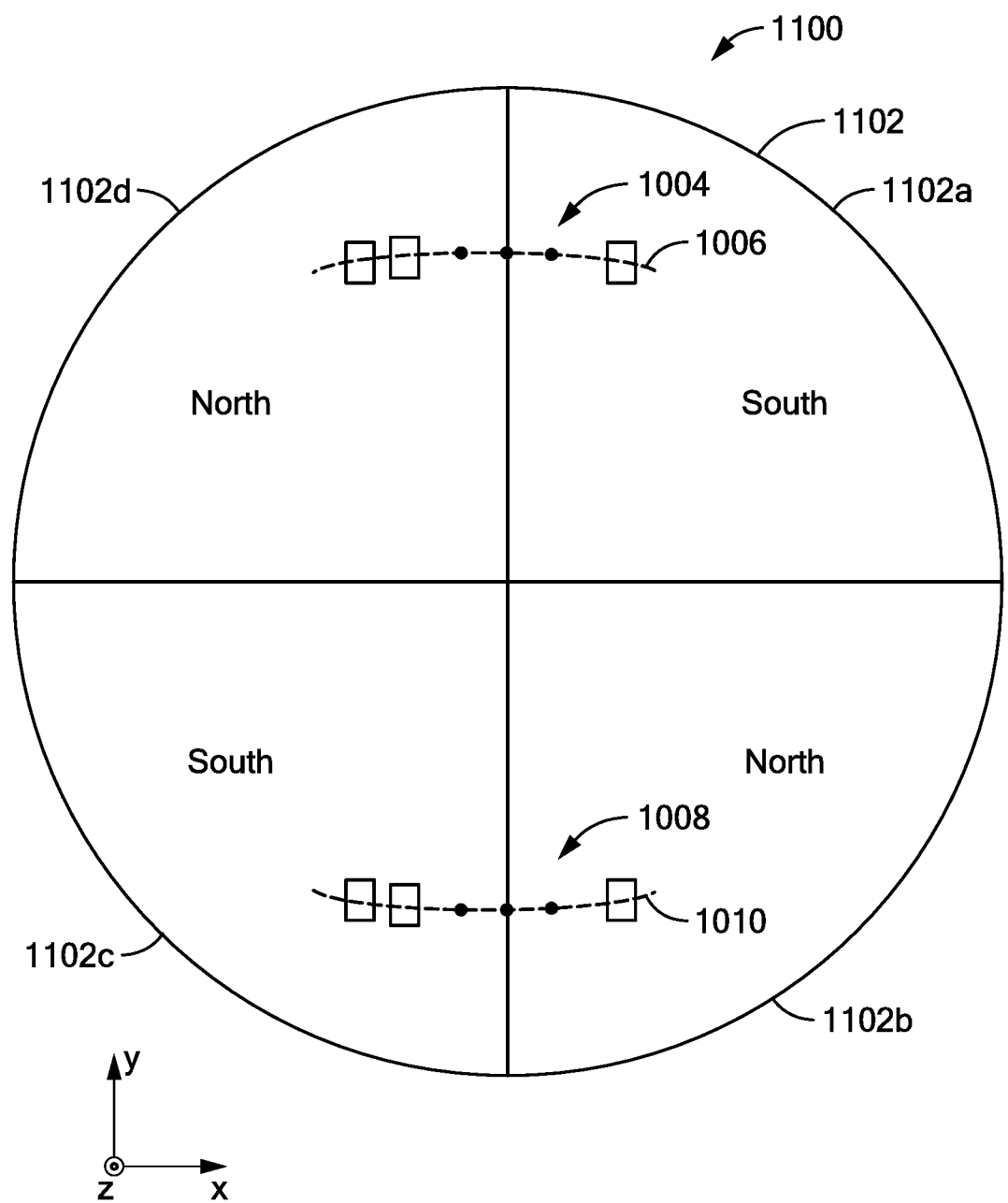
FIG. 11 is a pictorial showing two rows of magnetoresistance elements, e.g., GMR elements, arranged in two arcs, in relation to a four pole circular magnet.

Referring now to FIG. 11, in which like elements of FIG. 10 are shown having like reference designations, in a magnetic arrangement 1100, instead of the circular magnet 102 with two poles 102a, 102a, a circular magnet 1102, with four poles 1102a, 1102b, 1102c, 1102d can be used in place of the circular magnet 102.

Aspects of FIGS. 1-9 described above also pertain to the magnetic arrangement 1100.

All references cited herein are hereby incorporated herein by reference in their entirety.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

Elements of embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A magnetic field sensor for sensing an absolute position of a magnet capable of turning around a rotation axis, the magnet having a magnetic region with a boundary line between and separating a north and a south pole and with a north-south line passing through the north pole and the south pole, the magnetic field sensor comprising:
    a first row of magnetic field sensing elements comprised of a first three or more magnetic field sensing elements disposed proximate to the magnet and arranged along a selected one of a first straight line disposed in an x-y plane or a first arc disposed in the x-y plane, the x-y plane substantially perpendicular to the rotation axis, the first three or more magnetic field sensing elements operable to generate a first three or more signals;
    a second row of magnetic field sensing elements comprised of a second three or more magnetic field sensing elements disposed proximate to the magnet and arranged along a selected one of a second straight line parallel to the first straight line disposed in the x-y plane or a second arc disposed in the x-y plane, the second three of more magnetic field sensing elements operable to generate a second three or more signals, wherein the first row of magnetic field sensing elements and the second row of magnetic field sensing elements are disposed on opposite sides of the rotation axis;
    a first electronic channel coupled to the first three or more signals and operable to generate a first one or more values indicative of an angle of the north-south line relative to the first row of magnetic field sensing elements;
    a second electronic channel coupled to the second three or more signals and operable to generate a second one or more values indicative of an angle of the north-south line relative to the second row of magnetic field sensing elements; and
    a combining module operable to combine the first one or more values and the second one or more values to generate a relative angle value, wherein the relative angle value is indicative of a rotation angle of the magnet about the rotation axis relative to a position of the first and second rows of magnetic field sensing elements.

2. The magnetic field sensor of claim 1, wherein the first electronic channel comprises:
    a first one or more comparators coupled to the first three or more signals, the first one or more comparators operable to compare the first three or more signals with a first respective three or more threshold values and to generate a first three or more two-state values according to the first three or more signals;
    a first register operable to store the first three or more two-state values to generate a first three or more digital bits of a first digital word;
    a first decoder operable to decode the first digital word to generate the first one or more values; and wherein the second electronic channel comprises:
    a second one or more comparators coupled to the second three or more signals, the second one or more comparators operable to compare the second three or more signals with a second respective three or more threshold values to generate a second three or more two-state values according to the second three or more signals;
    a second register operable to store the second three or more two-state values to generate a second three or more digital bits of a second digital word; and
    a second decoder operable to decode the second digital word to generate the second one or more values.

3. The magnetic field sensor of claim 2, wherein the first one or more values comprises a first value and the second one or more values comprises a second value, wherein the combining module comprises:
    a differencing circuit operable to generate a difference between the first and second values.

4. The magnetic field sensor of claim 1, wherein the first electronic channel comprises:
    a first one or more signal sampling circuits coupled to the first three or more signals, the first one or more signal sampling circuits operable to generate a first three or more sample values according to the first three or more signals, wherein the first three or more sample values are arranged in time as a first sequential signal, and wherein the second electronic channel comprises:
    a second one or more signal sampling circuits coupled to the second three or more signals, the second one or more signal sampling circuits operable to generate a second three or more sample values according to the second three or more signals, wherein the second three or more sample values are arranged in time as a second sequential signal.

5. The magnetic field sensor of claim 1, wherein the combining circuit comprises:
    a phase difference module operable identify a phase difference between the first and second sequential signals.

6. The magnetic field sensor of claim 5, wherein the phase difference circuit comprises a zero crossing difference module operable to generate the phase difference as a time difference between zero crossings of the first and second sequential signals.

7. The magnetic field sensor of claim 5, further comprising:
    a first filter coupled between first one or more sampling circuits and the phase difference module and operable to generate a first filtered signal; and
    a second filter coupled between the second one or more sampling circuits and the phase difference module and operable to generate a second filtered signal, wherein the phase difference module is operable to identify a phase difference between the first and second filtered signals.

8. The magnetic field sensor of claim 7, wherein the phase difference module comprises a zero crossing difference module operable to generate the phase difference as a time difference between zero crossings of the first and second filtered signals.

9. The magnetic field sensor of claim 1, wherein the first three or more magnetic field sensing elements comprise a first three or more GMR elements and the second three or more magnetic field sensing elements comprise a second three or more GMR elements.

10. The magnetic field sensor of claim 1, wherein the first three or more magnetic field sensing elements comprise a first three or more TMR elements and the second three or more magnetic field sensing elements comprise a second three or more TMR elements.

11. The magnetic field sensor of claim 1, wherein the first three or more magnetic field sensing elements comprise a first three or more magnetoresistance elements and the second three or more magnetic field sensing elements comprise a second three or more magnetoresistance elements.

12. The magnetic field sensor of claim 1, wherein the first three or more magnetic field sensing elements comprise a first three or more vertical Hall elements and the second three or more magnetic field sensing elements comprise a second three or more vertical Hall elements.

13. The magnetic field sensor of claim 1, wherein the magnet has a plurality of magnetic regions with a plurality of boundary lines between and separating more than two north and south pole pairs.

* * * * *

UNITED STATES PATENT AND TRADEMARK OFFICE
CERTIFICATE OF CORRECTION

PATENT NO. : 11,237,020 B2
APPLICATION NO. : 16/683800
DATED : February 1, 2022
INVENTOR(S) : Paul A. David et al.

Page 1 of 2

It is certified that error appears in the above-identified patent and that said Letters Patent is hereby corrected as shown below:

In the Claims

Column 1, Line 21 delete "and" and replace with --an--.

Column 2, Line 33 delete "of more" and replace with --or more--.

Column 6, Line 43 delete "experience" and replace with --experienced--.

Column 7, Line 13 delete "element" and replace with --elements--.

Column 7, Line 17 delete "element" and replace with --elements--.

Column 7, Line 41 delete "element" and replace with --elements--.

Column 7, Line 45 delete "element" and replace with --elements--.

Column 8, Line 2 delete "element" and replace with --elements--.

Column 8, Line 6 delete "element" and replace with --elements--.

Column 8, Line 22 delete "an" and replace with --and--.

Column 8, Line 42 delete "degree," and replace with --degrees,--.

Column 8, Line 57 delete "element" and replace with --elements--.

Column 8, Line 61 delete "element" and replace with --elements--.

Column 9, Lines 44-45 delete "receive plurality" and replace with --receive a plurality--.

Signed and Sealed this
Seventh Day of March, 2023

Katherine Kelly Vidal
*Director of the United States Patent and Trademark Office*

CERTIFICATE OF CORRECTION (continued)
U.S. Pat. No. 11,237,020 B2

Column 10, Line 14 delete "value" and replace with --values--.

Column 10, Line 15 delete "signal" and replace with --similar--.

Column 10, Line 18 delete "826 is operable" and replace with --826 operable--.

Column 10, Line 19 delete "to difference" and replace with --to the difference--.

Column 11, Line 13 delete "and amplified" and replace with --an amplified--.

Column 12, Line 12 delete "above," and replace with --above.--.

Column 12, Line 48 delete ", PC," and replace with --, $I^2C$,--.

In the Claims

Column 13, Line 44 delete "of more" and replace with --or more--.

Column 14, Line 49 delete "operable identify" and replace with --operable to identify--.